United States Patent
Michalowitz et al.

(10) Patent No.: US 11,870,785 B2
(45) Date of Patent: Jan. 9, 2024

(54) COMPUTERIZED PLATFORM FACILITATING COMMUNICATION BETWEEN END-USERS

(71) Applicant: GOOGALE (2009) LTD., Cesaria (IL)

(72) Inventors: Nir Michalowitz, Cesaria (IL); Iris Yam, Cesaria (IL)

(73) Assignee: GOOGALE (2009) LTD., Cesaria (IL)

( * ) Notice: Subject to any disclaimer, the term of this patent is extended or adjusted under 35 U.S.C. 154(b) by 443 days.

(21) Appl. No.: 16/972,232

(22) PCT Filed: Jun. 6, 2019

(86) PCT No.: PCT/IL2019/050650
§ 371 (c)(1),
(2) Date: Dec. 4, 2020

(87) PCT Pub. No.: WO2019/234747
PCT Pub. Date: Dec. 12, 2019

(65) Prior Publication Data
US 2021/0234866 A1    Jul. 29, 2021

Related U.S. Application Data

(60) Provisional application No. 62/681,142, filed on Jun. 6, 2018.

(51) Int. Cl.
*H04L 9/40* (2022.01)
*H04N 21/45* (2011.01)
(Continued)

(52) U.S. Cl.
CPC ......... *H04L 63/105* (2013.01); *H04N 21/454* (2013.01); *H04N 21/4532* (2013.01); *H04N 21/4665* (2013.01)

(58) Field of Classification Search
CPC ...... H04L 67/52; H04N 21/258; H04N 21/25; H04N 21/25883; H04N 21/25891;
(Continued)

(56) References Cited

U.S. PATENT DOCUMENTS

| 9,871,798 B2 | 1/2018 | Michalowitz |
| 2003/0028873 A1* | 2/2003 | Lemmons ........ H04N 21/25883 348/588 |

(Continued)

FOREIGN PATENT DOCUMENTS

| WO | 2016/203472 A1 | 12/2016 |
| WO | 2016/203473 A1 | 12/2016 |

(Continued)

OTHER PUBLICATIONS

"What is preference Learning? And how is it different from machine learning?" Quora, 2009, <https://www.quora.com/What-is-preference-Learning-And-how-is-it-different-from-machine-learning>.

(Continued)

*Primary Examiner* — Olugbenga O Idowu
(74) *Attorney, Agent, or Firm* — Oliff PLC

(57) ABSTRACT

A computerized system providing parental supervision of child consumers of digital media, comprising an electronic repository of digital content; user interface for children, adults, digital content providers and guidance providers where digital content providers may upload digital content items into the repository and guidance providers may provide guidance objects for adults which are specific for subsets of children end-users being defined in terms of metadata, and for specific spots within, or portions of, specific items in the digital contents items; and logic including a central processor and configured to control interactions of the user interfaces with the processor and between various end-users at least partly depending on the category of each (Continued)

end-user wherein the logic presents overlaid digital content item/s to child C, including generating the overlaid item by selecting guidance object G specific to subset to which C belongs, and integrating G into the digital content as an overlay.

14 Claims, 11 Drawing Sheets

(51) Int. Cl.
*H04N 21/454* (2011.01)
*H04N 21/466* (2011.01)

(58) Field of Classification Search
CPC ............. H04N 21/4532; H04N 21/458; H04N 21/4586; H04N 21/4668; H04N 21/4662; H04N 21/4666; H04N 21/47; H04N 21/4784; H04N 21/488; H04N 21/4882; H04N 21/4884; H04N 21/4886; H04N 21/4888
See application file for complete search history.

(56) References Cited

U.S. PATENT DOCUMENTS

| | | |
|---|---|---|
| 2013/0185765 A1 | 7/2013 | Hew et al. |
| 2014/0344951 A1* | 11/2014 | Brewer ................. G06F 3/0488 726/28 |
| 2014/0356844 A1 | 12/2014 | Bharadwaj |
| 2015/0149294 A1* | 5/2015 | Killick ............... G06Q 30/0269 705/14.66 |
| 2017/0187717 A1 | 6/2017 | Michalowitz |
| 2018/0114461 A1 | 4/2018 | Michalowitz et al. |
| 2018/0136903 A1 | 5/2018 | Michalowitz |
| 2018/0203989 A1 | 7/2018 | Michalowitz et al. |

FOREIGN PATENT DOCUMENTS

| | | |
|---|---|---|
| WO | 2016/203474 A1 | 12/2016 |
| WO | 2017/068580 A1 | 4/2017 |

OTHER PUBLICATIONS

Fürnkranz et al., "Preference Learning: An Introduction," Preference Learning, 2010, pp. 1-17.

Fürnkranz et al., "Pairwise Preference Learning and Ranking," European Conference on Machine Learning, LNAI 2837, 2003, pp. 145-156.

De Gemmis et al., "Preference Learning in Recommender Systems," Preference Learning, 2009, vol. 41, pp. 41-55.

Bhargava et al., "Active Algorithms For Preference Learning Problems with Multiple Populations," 2016, arXiv preprint arXiv:1603.04118, pp. 1-19.

"Command-line interface," Wikipedia, Retrieved Aug. 25, 2019, <https://en.wikipedia.org/wiki/Command-line_interface>.

"Query String," Wikipedia, Retrieved Jul. 19, 2019, <https://en.wikipedia.org/wiki/Query_string>.

* cited by examiner

Fig. 7

Bondee ( Next Child )

 Do you want Taylor to focus on specific topics?
Our toolbox is a great add-on to help your kids exercise areas they find more difficult.

   ( Yes )    ( No )

Pick at last one

| Language Skills | Counting | reading comprehension |
| --- | --- | --- |
| Emotional | Geography | colors |

Fig. 8

B

 You can read page out to Taylor, and then wait for her to find all the objects.

a drumstick, a 2, a jar of red paint, and a cow that can moo.

Fig. 9
Pick a category to practice with Taylor
Practice Counting
Practice Spelling
Vocabulary
Self Esteem
Fig. 10
← Practice Counting
1. Ask Taylor to count how many yellow triangles she can find. If she enjoys this exercise move on to the other colors of triangles on this page, or continue to the next exercise.
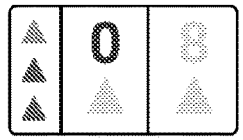
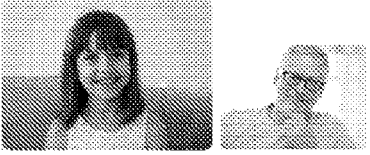
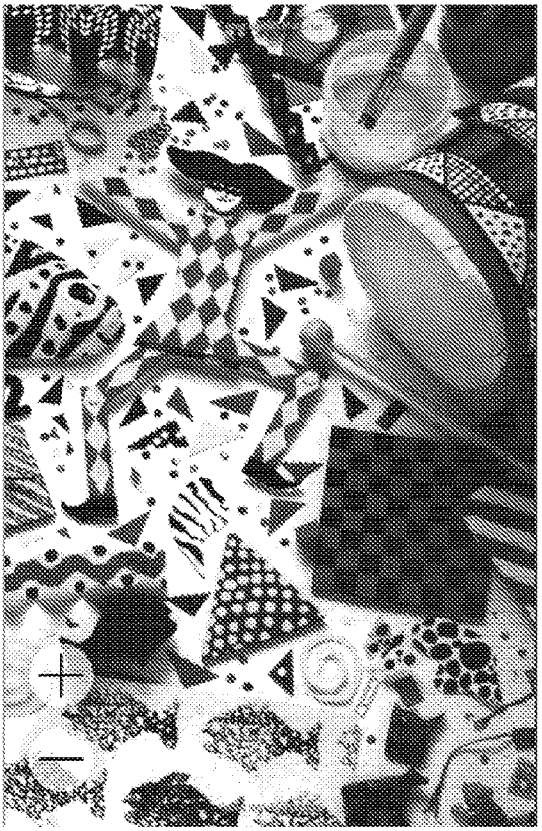

Fig. 13

| spot # | Spots | Description |
|---|---|---|
| Pre | 1 | Pg.3 |
| | 2 | Pg.4 |
| Post | | When we finish |

CLTG

Spot #1 | Pg.3

| No. | Advice |
|---|---|
| 1 | Fox's Intentions |
| 2 | |
| + | |

Fox's Intentions

Do you think the Fox's intentions were good or bad?

☑ Overlay ☐ Link

Parent Type

A mouse took a stroll through a deep dark wood.
A fox saw the mouse and the mouse looked good.
"Where are you going to, little brown mouse?
Come and have lunch in my underground house."
"It's terribly kind of you, Fox, but no -
I'm going to have lunch with a graffalo."

"A graffalo? What's a graffalo?"
"A graffalo! Why, didn't you know?"

Mark

ID
COMPUTERIZED PLATFORM FACILITATING COMMUNICATION BETWEEN END-USERS

REFERENCE TO APPLICATIONS

Priority is claimed from U.S. Provisional Patent Application No. 62/681,142 entitled "Computerized Platform Providing Parental Supervision Of Child Consumers Of Digital Media" and filed 6 Jun. 2018, the disclosure of which application/s is hereby incorporated by reference.

FIELD OF THIS DISCLOSURE

The present invention relates generally to computerized systems and more particularly to computerized systems supporting communication between end-users.

BACKGROUND FOR THIS DISCLOSURE

Conventional technology constituting background to certain embodiments of the present invention is described in the following co-owned published patent documents inter alia:

Secured Computerized System For Children and/or Pre-Literate/Illiterate Users, published as WO 2016/203474 and as US 2018/0203989;

Improved Computerized System Facilitating Secured Electronic Communication between and with children published as WO 2016/203473 and as U.S. Pat. No. 9,871,798; see also US 2018/0114461.

A Computerized System Including Rules For A Rendering System Accessible To Non-Literate Users Via A Touch Screen, Published as WO 2016/203472 and as US-2018-0136903-A1.

The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments of the present invention seek to provide a platform that enables an edutainment system.

Certain embodiments of the present invention seek to provide computerized systems adapted for use by end users who are separated by distance, age, authority or some other parameter such as children and adults, teachers and students, instructors and listeners etc.

Certain embodiments of the present invention seek to provide an eco-system facilitating convenient interaction and/or accumulation of and use of data, between various players involved in a child's life in the digital era, where typically each player or entity or category of end-user making use of the platform, contributes data to the platform and benefits from data in the platform which may also include data pertaining to the emotional state of the Platform User together with other emotional indicators of the other platform users.

Certain embodiments of the present invention seek to provide a computerized platform providing parental supervision of child consumers of digital media and/or supporting guided interactions with child end-users.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented as appropriate.

The following terms may be construed either in accordance with any definition thereof appearing in the prior art literature or in accordance with the specification, or to include in their respective scopes, the following:

Knowledge item—e.g. Data with properties and metadata. Any implementation for data storage may be employed herein e.g. tables in db, xml, mime, metadata, typically stored in a big data repository.

Publishing a knowledge item e.g. writing to a repository. Typically includes categorizing by adding properties and/or tabs and/or meta data to it. May also be scanned and categorized by the big data analysis services, then typically becomes part of a mesh of information.

Action: e.g. Talk to a child about a topic. Other examples of "actions" may include:

Play a game (maybe online personalized quiz), Encourage siblings to interact with each other Continue role play (socio dramatic instructions and guidance to parents), Plan to watch the next chapter, Remind the parent to remind the child. (part of child parent system), Plan a trip to a museum, zoo, plan to go out and see a stargazing phenomenon (such as state of the moon, special location of stars/constellations/meteor shower), Do a home ("kitchen") experiment, Plan to see a movie together, Buy some kits online and do arts and crafts together, Order a book online and read it, Deal with emotional issues through multi-faceted interaction.

Content consumption behavioral analysis: because the child identity is secure, content providers typically get usage logs and thus have much more accurate usage data of their content (not only rating or server-side data, but also accurate consumption time typically accurate to the second). Thus, they may understand usage habit in detail, improve the content, better categorize it, add suitable knowledge, and encourage the crowd to add content knowledge. This way content providers may be exposed to a more accurate, vibrant and ever improving content ecosystem.

Algorithmic knowledge item: an algorithm may create knowledge items. For example, an expert may write an algorithm that, instead of him using the expert knowledge application (that is used to manually add/remove/manage content) he maintains (adds and/or removes and/or modifies) metadata to content.

All objects (knowledge, triggers, rules etc.) may have a property of age and other educational properties, such as knowledge level in an area, which enables easy personalization for parents.

Trigger—Intended to include an object stored in the Rules & Triggers repository. Trigger typically includes a set of rules that when matched (e.g. if conditions stipulated in rules are satisfied e.g. are true), an event is fired. Applications register for triggers and when the event is fired the application is notified and may take action. For example: A trigger may be created with a rule that fires when a child watches one hour of content marked with High educational value. The Digital health ecology wallet application may register for that trigger and when notified may give the child a special digital badge for his achievement and increase his Media credit.

A Trigger may have a rule associated with it, rules may define the knowledge associated with it, and then they have an audience (such as a child, parent, family member, teacher). A user may configure triggers, either specifically or by application, that take trigger templates and knowledge items and combine them into a trigger. Typically, parents use rules prepared by experts and tailor them for their specific situation (by combining info/knowledge, published by for example teachers' and child schedule, and parents constraint into specific triggers).

A trigger may for example help a young child manage morning activities (wake up, brush teeth, get dressed, eat, be ready for school bus), as well as rest and sleep times and afternoon activities.

A user/application registers a trigger and the system may fire it when the rules match. Several apps may register for the same triggers, such that, for example, the media usage enforcement system and the child PA system on the TV, mobile device and IoT devices (light switch, speaker, shutters in a child's room), and the parent version of the child PA, may register for all or any subset of the PA related triggers. Like For example a trigger for when a type of content is consumed at specific time window, or a trigger for time to prepare to leave home for some event—that may be consumed by the ChildPA application to show the notification, by the ParentPA to check that he gets ready and be aware that the child need to get ready, and by the Smart TV media App to notify the child and support him to get ready for example by pausing the media consumption and proper notification . . . .

A content filter may include a kind of rule applied to filter content and may combine all kinds of cross properties.

A dynamic rule may include an API that enables to plug an external algorithm (running locally or remote) to the rule system. It may consume parameters and return a value. The system knows and includes it when it builds a rule tree and when it activates it.

The Rule Tree typically comprises a set of Rules e.g. rule paragraphs which may be organized in a tree. Each Rule Paragraph computes a result value based on parameters that it consumes, aka Input parameters e.g. of a function. The Paragraph typically returns a Named and typed Value such that the value that is returned by the paragraph has a specific name and type. There may be rule Paragraphs that return a value and do not have input parameters. This enables to expose system/component parameters or system values like current time. A paragraph that returns current time may require no parameters and may return the current system time. Rule Paragraphs that do not have Computed parameters e.g. their parameters do not need to be computed by another RuleParagraph are called leaf rule paragraphs. When a Value is needed, a rule tree is created by finding the Paragraph that returns the needed Value and putting it at the root of the rule tree. Then for each parameter needed by the rule paragraph, a sub tree is created by adding tree that computes the parameter. This process may be performed recursively for all parameters.

For example: The top of a rule tree may return a Boolean expression based on some parameters. These parameters may need to be computed (based on other parameters). So for each parameter that needs to be computed, there may be a Rule Tree that may compute it (sometimes based on other parameters).

The system typically maintains a Rules repository that stores Rule Paragraphs. Typically, Each time it needs a Parameter, it looks for a rule paragraph that returns it and creates it's rule tree. Rule trees may be created on the fly And may be optimized e.g. so that a value that is needed several times may be computed once and cached for the other usages. Rule trees may be cached e.g. to eliminate the need to rebuild the tree recursively each time a parameter is needed.

A dynamic algorithm is typically analogous, but plugs into the trigger or knowledge systems. It may, for example, inject data from the big data analyzer system. A dynamic algorithm like SQL Based query from a DB or some AI based algorithm that looks on Big Data may be analogus to applying a complex rule tree.

The term media connector may include any components that connect media providers to the system. They may use a media connector API that exposes a model that enables media providers to interact with the system.

Modules, subsystem, apparatus, and units described herein may each include processors.

Persistent object: may include an object stored in a data repository which persists across sessions e.g. a document that a user creates on day1 and saves to a database, which is then in a subsequent session on day 2.

Non-persistent may include an object created at runtime, and does not persist across sessions.

Adult end-user: herein used to refer to an end-user associated with a specific child and is authorized to communicate therewith via the system herein. Technology for providing a child-safe space allowing a child to communicate only with selected others including only selected adults is described e.g. in the co-owned patent document referred to herein re "secured electronic communication between and with children".

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

The present invention typically includes at least the following embodiments:

Embodiment 1. A computerized system providing parental supervision of child consumers of digital media, the system comprising all or any subset of: an electronic repository of digital content; user interfaces for each of various categories of end user including at least a children end-user user interface, an adult end-user user interface, a digital content provider user interface and a guidance provider user interface, configured respectively for use by children end-users, adult end-users respectively associated with specific end-users from among the children end-users, digital content providers uploading digital content items into the repository and guidance providers providing guidance objects for adults which are each specific for (a) subsets of the children end-users, the subsets being defined in terms of metadata stored for individual children from among the children end-users, and for (b) specific spots within, or portions of, specific items in the digital contents items; and logic including at least a central processor and configured to control interactions of the user interfaces with the processor and between various end-users at least partly depending on the category of each end-user, wherein the logic is operative to present at least one overlaid digital content item to at least one child C from among the child end-users, including generating the overlaid digital content item by selecting a guidance object G which is specific to a subset S to which child C belongs, and integrating the guidance into the digital content as an overlay.

Embodiment 2. A system according to any of the preceding embodiments wherein the logic enables parents to define rules to be enforced on their children's consumption of selected digital content times.

Embodiment 3. A system according to any of the preceding embodiments and also comprising a big data repository storing big data, at least some of which is anonymized, characterizing the children end-users' behavior vis a vis the system including the children end-users' consumption of digital content.

Embodiment 4. A system according to any of the preceding embodiments and wherein the system also includes a sub-system for with communication functionality e.g. social networking and/or email, for children users and wherein the big data repository also includes big data characterizing the children end-users' behavior vis a vis the sub-system.

Embodiment 5. A system according to any of the preceding embodiments which includes a personal assistant which manages the child's schedule and a digital health management subsystem which supervises the child's digital consumption and wherein the assistant and subsystem share data such that a child consumes digital content according to rules defined within the system and at times and/or as per conditions defined within the personal assistant.

Embodiment 6. A system according to any preceding embodiment which limits child consumption of content at least partly based on educational ratings of content such that all other things being equal, a child may be allowed to consume either more content rated as more educational or less content rated as less educational.

Embodiment 7. A system according to any preceding embodiment which creates an economy including digital coins which buy access to otherwise restricted data (e.g. content) in return for generating data for the system (e.g. if an end-user performs educational research, this may buy digital entertainment time for that end-user).

Embodiment 8. A system according to any of the preceding embodiments wherein the children end-users are divided into classes and wherein the categories also include educator end-users linked to specific classes.

Embodiment 9. A system according to any of the preceding embodiments wherein the categories also include knowledge area experts.

Embodiment 10. A system according to any of the preceding embodiments wherein the digital content items includes at least one of the following activities: games, books, audio visual content, augmented reality content.

Embodiment 11. A system according to any of the preceding embodiments wherein the metadata comprises child-age-metadata which characterizes at least ages of the children end-users and wherein the guidance providers provide at least one guidance object for adults which is specific for a subset S of the children end-users which is defined in terms of the child-age metadata such as a subset of all children end-users whose ages fall between 5 and 8 years.

Embodiment 12. A system according to any of the preceding embodiments wherein the system provides big data regarding children end-users to at least one user of the system and wherein the system also comprises an anonymizer configured to anonymize the big data before the big data is provided to the at least one user of the system.

Embodiment 13. Processing circuitry comprising at least one processor and at least one memory and configured to perform at least one of or any combination of the described operations or to execute any combination of the described modules.

Embodiment 14. A computerized method providing parental supervision of child consumers of digital media, the method comprising: Providing an electronic repository of digital content; Providing user interfaces for each of various categories of end user including at least a children end-user user interface, an adult end-user user interface, a digital content provider user interface and a guidance provider user interface, configured respectively for use by children end-users, adult end-users respectively associated with specific end-users from among the children end-users, digital content providers uploading digital content items into the repository and guidance providers providing guidance objects for adults which are each specific for (a) subsets of the children end-users, the subsets being defined in terms of metadata stored for individual children from among the children end-users, and for (b) specific spots within, or portions of, specific items in the digital contents items; and Providing logic including at least a central processor and configured to control interactions of the user interfaces with the processor and between various end-users at least partly depending on the category of each end-user, wherein the logic is operative to present at least one overlaid digital content item to at least one child C from among the child end-users, including generating the overlaid digital content item by selecting a guidance object G which is specific to a subset S to which child C belongs, and integrating the guidance into the digital content as an overlay.

Embodiment 15. A computer program product, comprising a non-transitory tangible computer readable medium having computer readable program code embodied therein, the computer readable program code adapted to be executed to implement a computerized method providing parental supervision of child consumers of digital media, the method comprising: Providing an electronic repository of digital content; Providing user interfaces for each of various categories of end user including at least a children end-user user interface, an adult end-user user interface, a digital content provider user interface and a guidance provider user interface, configured respectively for use by children end-users, adult end-users respectively associated with specific end-users from among the children end-users, digital content providers uploading digital content items into the repository and guidance providers providing guidance objects for adults which are each specific for (a) subsets of the children end-users, the subsets being defined in terms of metadata stored for individual children from among the children end-users, and for (b) specific spots within, or portions of, specific items in the digital contents items; and Providing logic including at least a central processor and configured to control interactions of the user interfaces with the processor and between various end-users at least partly depending on the category of each end-user, wherein the logic is operative to present at least one overlaid digital content item to at least one child C from among the child end-users, including generating the overlaid digital content item by selecting a guidance object G which is specific to a subset S to which child C belongs, and integrating the guidance into the digital content as an overlay.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices. Any reference to a computer, controller or processor is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs) or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety. Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system illustrated or described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein which may for example include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "UI" as used herein includes also the underlying logic or processor which controls the data presented to the user e.g. by the system display and receives and processes and/or provides to other modules herein, data entered by a user e.g. using her or his workstation/device.

BRIEF DESCRIPTION OF THE DRAWINGS

Certain embodiments of the present invention are illustrated in the following drawings; in the block diagrams, arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a standard communication protocol may be employed, such as but not limited to HTTP or MQTT, and may be combined with a standard data format, such as but not limited to JSON or XML.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. Tables herein may include all or any subset of the fields and/or records and/or cells and/or rows and/or columns described.

FIGS. 5-11 are screen displays, all or any subset of, including all or any subset of the illustrated components, may be generated by the adult user-interface and presented to an adult end-user according to certain embodiments, e.g. during an adult-child session; all or any subset of the illustrated elements, here and in other drawings herein, may be provided. The word "Bondi" is simply a reference to a system provided in accordance with embodiments of the invention. FIG. 10, specifically, is typically presented to an adult end-user if the "practice counting" option is selected by the end-user in the screen display of FIG. 9; FIG. 11 provides guidance to the adult (grandparent, remote teacher geographically separated from her or her student, etc.), note guidances to adults may be presented e.g. as an overlay or otherwise visible element displayed simultaneously with the screen display seen by the child.

FIG. 13 is a screen display, which also may be generated by the adult user-interface and presented to an adult end-user according to certain embodiments, e.g. during an adult-child session; all or any subset of the illustrated elements, here and in other drawings herein, may be provided.

Figure 1:
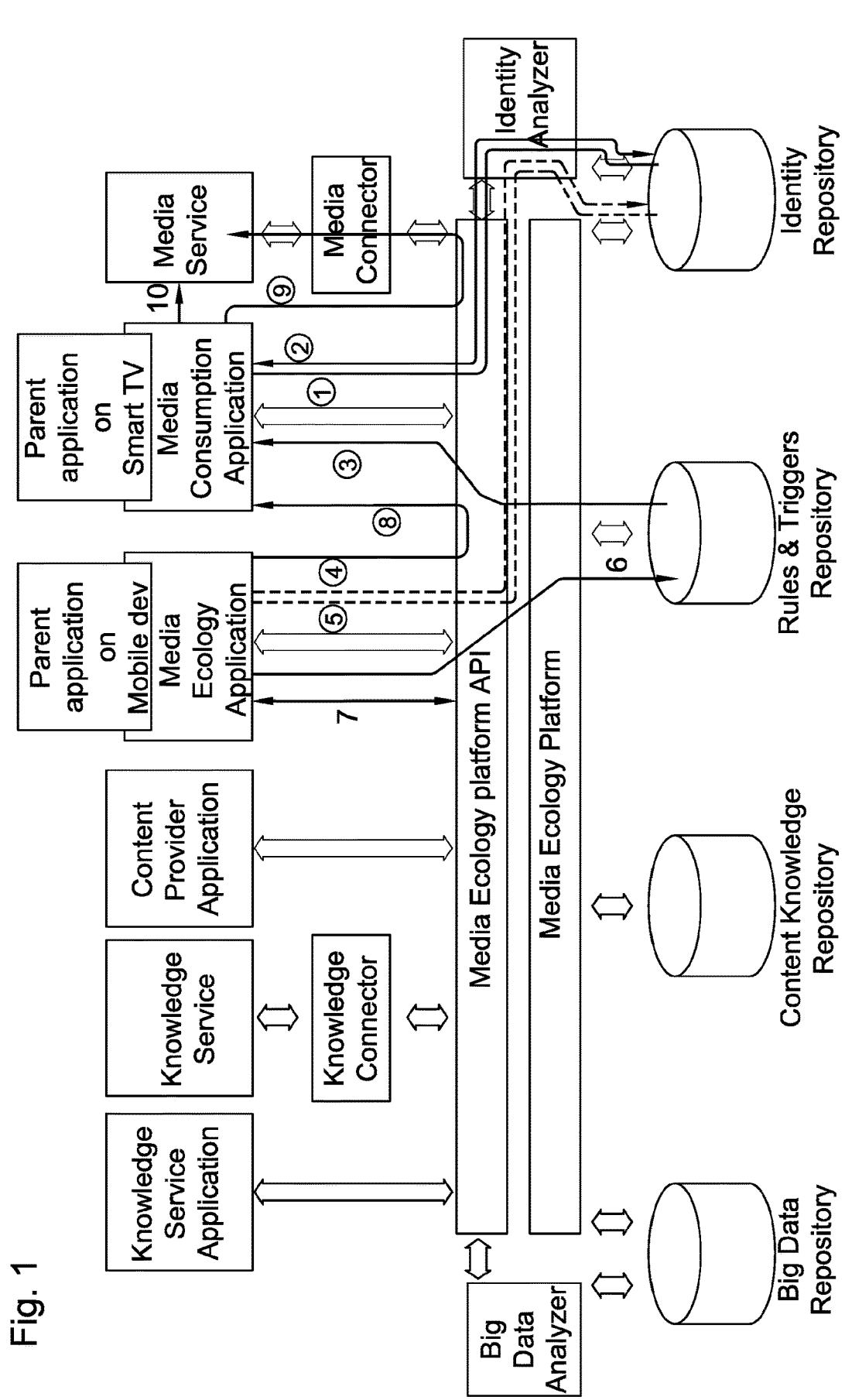
FIGS. 1, 2, 3 herein, aka Drawings a1, a2, a3 respectively, illustrate example workflows for an example system constructed and operative in accordance with certain embodiments.

Computational, functional or logical components described and illustrated herein can be implemented in various forms, for example, as hardware circuits, such as but not limited to custom VLSI circuits or gate arrays or programmable hardware devices, such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs, and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology), or any combination thereof.

Functionality or operations stipulated as being software-implemented may alternatively be wholly or fully implemented by an equivalent hardware or firmware module, and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer, or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DSP or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use, and which is based on any suitable technologies such as semiconductor, magnetic, optical, paper and others.

DETAILED DESCRIPTION OF CERTAIN EMBODIMENTS

Certain embodiments seek to provide a computerized system having artificial intelligence to support maintenance of an emotional bonding connection between respective end-users (such as, say, children and their grandparents) who are disparate from one another physically and/or emotionally (e.g. both geographically and by virtue of a bi-generational gap). For example, the grandparent, unaided by the system herein, is burdened by a need to search for content that her or his grandchild would appreciate, to the extent that the grandparent even grasps that such content may facilitate his grandchild's appreciation of the communication session between them. Such a search, say, via general search engines, is time-consuming, and, even once found, is not integrated into the communication technology (say, Skype) that the child and his grandparent are using. The service enables communication face-to-face, but also integrates into such communication layers of activities and of child-specific (e.g. age-specific, typically based on system-stored metadata characterizing the child) guidance to the adult, which may be overlaid on the activities.

Certain embodiments seek to provide a computerized networked platform configured to receive overlays of guidance (from a first set of networked end users or providers) on top of activities (received from a second set of networked end users or providers which may be different from the first set) while maintaining the highest level of privacy of children end users engaging in the activities during child-adult sessions and of adults using the guidance overlays during these sessions. The platform supports efficient interaction of adult end-users with child end-users, including provision of content including activities for children with guidance for adults incorporated therewithin e.g. overlaid.

According to some embodiments, the service enables the incorporation of another layer of information/activity on top of the communication screen(s) (visual, interactive, informative, etc.) as the basis for the use of the platform as means of communication (visual, textual, audio etc.).

The system herein may, via the various user interfaces and the logic supporting them, enable each of various users (family members and others) to create a personal profile based on personal definitions and criteria of tastes, fields of interest and preferences, which may, on the one hand, support creation of a personal interface, and, on the other hand, permit the creation of mutual content, activities, interaction and media. For example, the user interface of the adult may present information (visual and otherwise) adapted for adults, while the screen on the other side, who might be a grandchild that has not yet learnt how to read, may present the relevant information in a visual, graphical and vocalized way, so that the grandchild can understand and relate.

For example, in contrast to the data being presented to the child, the presentation of data to the adult e.g. grandparent, may use a font size preference that suits the (possibly far-sighted) adult, but not the child. The data presented to the adult may include guidance which is absent from the data presented to the child. The data presented to the adult may include answers to questions, or challenges posed to the child.

The adult may be able to see the screens presented to the grandchild in addition to (or, selectably, instead of) his. Any mutual content created, may be stored organized e.g. based on emotional/contextual methodology.

In order to adjust the system for each user, the system may create either independently (autonomously) or in conjunction with a human user, activities that may incorporate parameters e.g. Preference for type of Content to consume, Preferred consumption time windows or guidance to specific content that has become relevant in the specific user's geography (snow in Egypt) that have been inserted during the registration process or at a later date. The system may adapt itself to the different defined parameters of the user(s) and these parameters and definitions may be adjusted on the basis of feedback For example after consumption the system may collect feedback from the consumer by means of 0-5 star like or the system notices that the child has started a new activity based on past activities and historical analysis of the interaction with the system of this user and of other users (big data).

The system may learn and advance itself by using algorithms based on AT and BD (Artificial intelligence and/or big data). For example, the system may use AT algorithms such as classifiers or deep learning to learn correlations between end-users' appreciation of different content items such that when a first content item is liked, another content item is, statistically, often liked as well. These correlations may be general, or may characterize certain sets of users having certain user metadata (such as 5 year old girls in Japan). This enables the system to propose the second content item to users (or pairs of users) who selected the first content item. Appreciation may be operationalized by any suitable measure recorded by the system e.g. selection of a content item, length of session spent on that content item, or explicit reviews provided by end-users.

The system may match all or any subset of content, activities, interaction and operational suggestions—including those based on preferences (or guiding rules) of third parties such as parents or guardians or any external (formal and approved non-formal) education systems or other external organizations who comply with the platform's baseline, who may not be directly involved with the interaction.

The system may selectably incorporate within layers of content such as games, storytelling, book reading, AR\VR, games, riddles, creative artwork, and personal questions, songs & music, and additional layers and/or additional activities. For example, during or at the end of a game interaction, the system may propose activation of exercise activities in various fields such as, say, math, language, grammar, social skills, and emotional skills.

Messages and information may be sent to session participants (e.g. child and adult) prior to the scheduled meeting/appointment/interaction/session between them if the system herein is integrated with appointments or calendar software, and may be based on the intended activities including emotional, cognitive and social recommendations. For example, the grandparent may get a message that the next interaction with his grandchild is scheduled for the day after, and may involve the family tree. He may be asked to answer questions.

The users are typically able to cancel distractions during any interaction (such as cancelling popups of other apps—Family Mode=Flight Mode which enables family interaction)

Certain embodiments are now described in detail.

Diagrams of example systems are illustrated in FIGS. 1-4 aka drawings a1-a3 and a, respectively.

Characteristics and components (all or any subset of which may be provided) of these and other embodiments, are now described in detail:

Different categories of end-users may be defined by the system logic to have different roles. For example, teachers, but not content providers and/or not children may be entitled to rate items of content as being more or less educational. Or, knowledge area experts, but not children, may be entitled to provide recommended rules, which may be derived by the experts from the platform's big-data, to parents. For example, experts may derive indications of giftedness or of delayed intellectual development, from the platform's big-data e.g. by comparing big-data of children known to be gifted or delayed, to big-data of children known not to be gifted or not to be delayed, respectively. Then, experts may recommend to parents of children found to be gifted as per the derived indications, that these children be exposed to content suitable, for e.g. enjoyed by, other children found to be gifted or delayed, respectively.

The system enables the creation of an eco-system where parents, families, formal education, informal education and trusted media providers, cooperate in order to provide a digital healthy environment that supports a healthy consumption of screen time and supports development of life skills through the support of day to day life of children in the digital world.

The system may be implemented in parts. Each part provides significant value and the entire system provides even further value.

In the system, parents create identities for students and link them with family members and educators. Parents then install applications on smart TV, mobile devices and IoT devices. Parents define rules of usage, triggers, and schedules. Teachers define tasks to complete schedules and give badges. Students get notifications from the systems and their media consumption is monitored and enforced. (content/content type/usage times/ . . . ). Parents get notifications about usage times, as well as about use patterns and what they may reflect.

An economy of usage is introduced. Parents create rules that govern the way the enforcement system operates.

The platform may include all or any subset of:
1. Identity system
2. Knowledge system
3. Rules and trigger system
4. Cloud based platform that implements and manages the elements 1, 2, 3 (above) and that provides client applications (mobile, desktop, and IoT), that enable the "edutainment eco system"

Role players or end-user types may include all or any subset of:
Child
Parent: of the child (manages the family members of the child)
Family member: (as defined by the parents)
Teacher: (manages a class that belongs to a school that belongs to a local authority)
Informal teacher: (example after school sports coach, dance teacher, music teacher, scouts leader, private teacher . . . )
Trusted content provider: (for example TV network, media companies, interactive media on-line games, websites, mobile application, IoT device management services and applications . . . )
Knowledge provider: (knowledge area experts, crowd based knowledge, AI, algorithmic knowledge for example knowledge created by applying big data algorithms . . . )

Figure 4A:
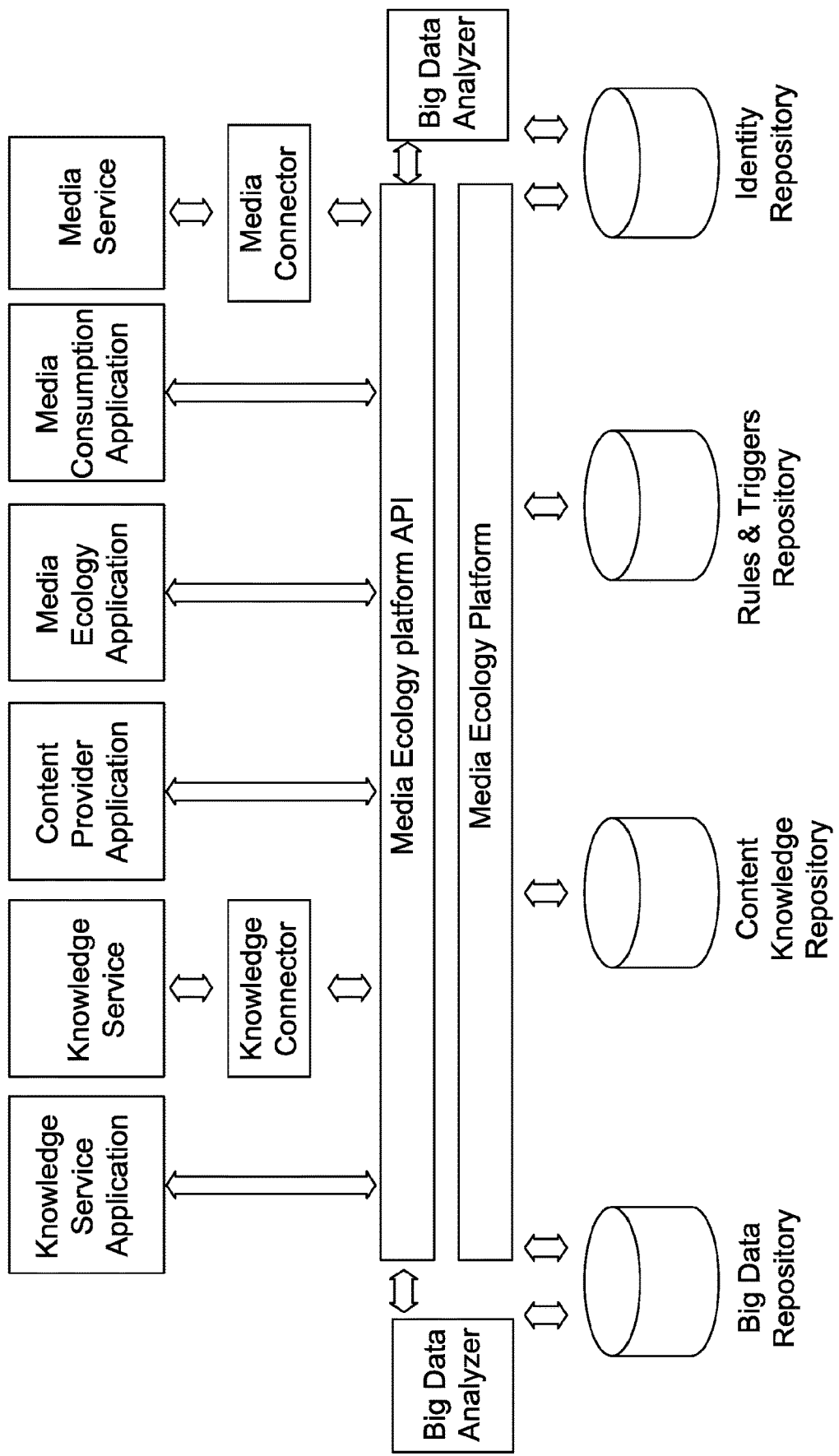
FIG. 4a herein, aka Drawing a, illustrates an example system constructed and operative in accordance with certain embodiments, all or any subset of whose blocks may be provided.
Figure 4B:
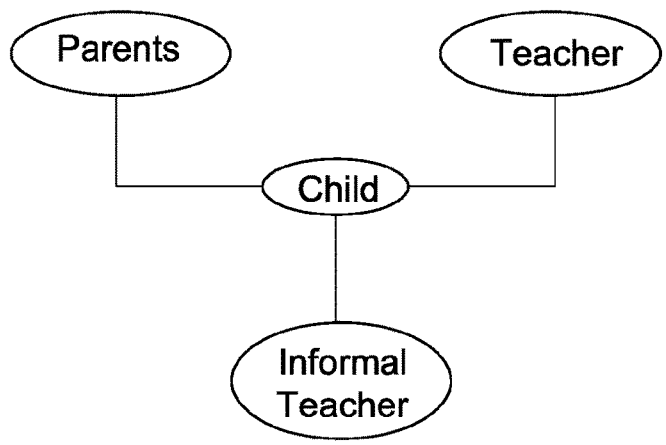
FIGS. 4b, 4c are simplified block diagrams illustrating embodiments of the invention.

Elements of the system may include all or any subset of:

An identity system which may be as shown in FIG. 4a (aka the "prov1" embodiment). Typically, at the center of the identity system is a child's typically strongly identified identity.
1. The child's identity is verified either by:
    a. A teacher that creates the child's identity as part of creating the list of students that participate in her class e.g. as per co-owned patent document referred to herein re "secured electronic communication between and with children". The teacher then enables parents to link the parents' identity with the child identity.
    b. A parent that creates the child identity and associates him/her with his (the parents') identity. The parent then links the child to a teacher (a secure algorithm here enables the two to link the child to the class—e.g. using the processes described in the co-owned patent document referred to herein re "secured electronic communication between and with children" where the second parent may be replaced by the teacher and the linkage of two children may be replaced with linking a child to a class.
2. Parents then add/link family members to the child (and, when needed, delegate different roles/rights to the family members. For example a parent can delegate to a grandmother the right to schedule "together time" with the child for reading with him a digital story through a "skype meeting" or to help him train his math skills.

Parents may also link the child with informal teacher thus delegating/enabling them to manage "time spots" on the child schedule, communicate/message the child/his parents re the informal activities/enable them to propose/add rules to the child rules/trigger DB, and thus support the child's "digital health economy".

3. Teachers may add other teachers that teach the child (if such a possibility has been enabled). Teachers may also connect between classes (and thus enable trusted connected groups).
4. Content providers also get a trusted identity and this way the system may trust the ranking/rating/notifications and triggers that the content system provides. This way, parents may set rules of usage, may get notifications before broadcast, may receive usage logs etc., may get recommendations, from the content providing systems, etc.

Knowledge system: typically enables knowledge providers to publish "knowledge items" that could later be used for providing content filters, content consumption behavioral analysis, and action recommendations.

Knowledge may be published by experts, by the crowd, and by algorithms (such as big data).

Knowledge items may be linked with content items. This way, for example, the system may notify parents (who request to be notified) that their child has consumed some content area and provide a specific recommendation for an action (for example "your child just watched a video about a dinosaur-talk with him about what dinosaurs used to eat. Here is a link about the subject. In addition there is a dinosaur exhibition nearby, and here is a coupon for the exhibition."

The system may maintain a list of gift proposals that are linked to the content that the child is consuming. (that the parent may check and order online upon demand). This may even be linked with the digital media wallet and digital health economy.

Knowledge items may also be articles, as well as algorithmic and conclusions based on a big data analysis.

Rules and Triggers System:

The rules and triggers system stores and manages the following types of rules and triggers:
1. Templates: these are examples of rules that may be copied in order to create personal rules, for example allow content consumption at specific times. Or allow a number hours of content consumption a day).
2. Personal: is specific to a user (child, parent, teacher)
   Example: (allow for a child to watch child program at evening time. Define evening as the time between 19:00-19:30)
   Define child program as the items recommended for 4-5 of your children by the "caring parents group" (a crowd effort that creates knowledge base of appropriate content.
3. Automatic: may be a system wide rule. May be applied to a user or a group of users.
4. Dynamic: may be derived from dynamic algorithms that reflect both on its content as well as on the group of users that it reflects.

Typically, rules are hierarchical. Each rule defines the way to compute a value based on input parameters. This way a rule may get the value of a "child rule" and consume it as a parameter. The rules are applied in a dynamic way, so when the system needs a value it may create the "rules tree" that builds that value, and so, for example, it may compute the value of the "child rule" and use it as the parameter value for the parent rule.

Typically, for each user, the system holds a set of triggers that the user registered for. And that way it may create the rule tree that drives each trigger. When a value is changed for one of the parameters that trigger a trigger, computation of the rule tree occurs, and the trigger may fire. Student client applications: may include all or any subset of:

Digital health management system: this system applies rules that supervise the child's digital consumption. It enables provisioning and reporting of a child's digital activities. May be deployed in layers (for example on devices such as mobile devices and TVs), as well as in the infrastructure (for example in a home gateway). This system connects through APIs to the platform in order to download rules and triggers from the rules, and triggers DB and log activities in the DB. Parents may define rules about content allowed and denied, the crowd may help filter what's in and out, experts may rate content as educational, teachers may mark content as homework, thus enabling the child to watch it (and it may or may not count as digital time).

Child personal assistant: this system manages child schedule and duties. It reminds the child of upcoming activities. It provides notification both to the child as well as to the parents. It enables the parents to monitor and see how their child copes with various obligations. The system may remind a child to prepare for scouts (ahead on time—say 15 minutes before he needs to leave). Given a rule set by the parents, it may remind the child to close and stop media consumption on the screen that he is using an/or through an IoT device like a speaker that may tell him that it's time to go.

It may assist with "morning preparations" in that parents may create a "morning schedule" that includes time to get out of bed, time to wash and brush teeth, time for breakfast, and so on.

Digital health economy wallet. The digital health wallet enables the creation of an economy around digital consumption and wellbeing. It enables creating and managing rules and triggers around digital behavior as well as external behaviors and/or emotional needs (for example if the parents are away on a trip, or an unusual event has materialized that may be worthy of a special content offering—e.g. snow in Egypt, for example performing educational research may provide the digital coins for buying "digital entertainment time".

Participating/volunteering in a crowd effort (like adding a location of a defibrillator to the defibrillator database) earning a scout badge so that an informal teacher (scout leader) may give a child a badge. Parents may enable a rule that enables a child to get "points/credits/digital health money" in return for a badge, and then use them in the edutainment world. Parents may give a badge in return for an image of the "organized room" sent to prove that the child's room has been cleaned and organized. This may then enable rules set on the digital health management system to give "usage credits" that enable usage of the edutainment systems for a certain time.

Because teachers are also involved, doing homework, completing missions in the school LMS, getting badges from teachers, may also be part of the digital health economy. Parents may then set the "exchange rates".

Figure 4C:
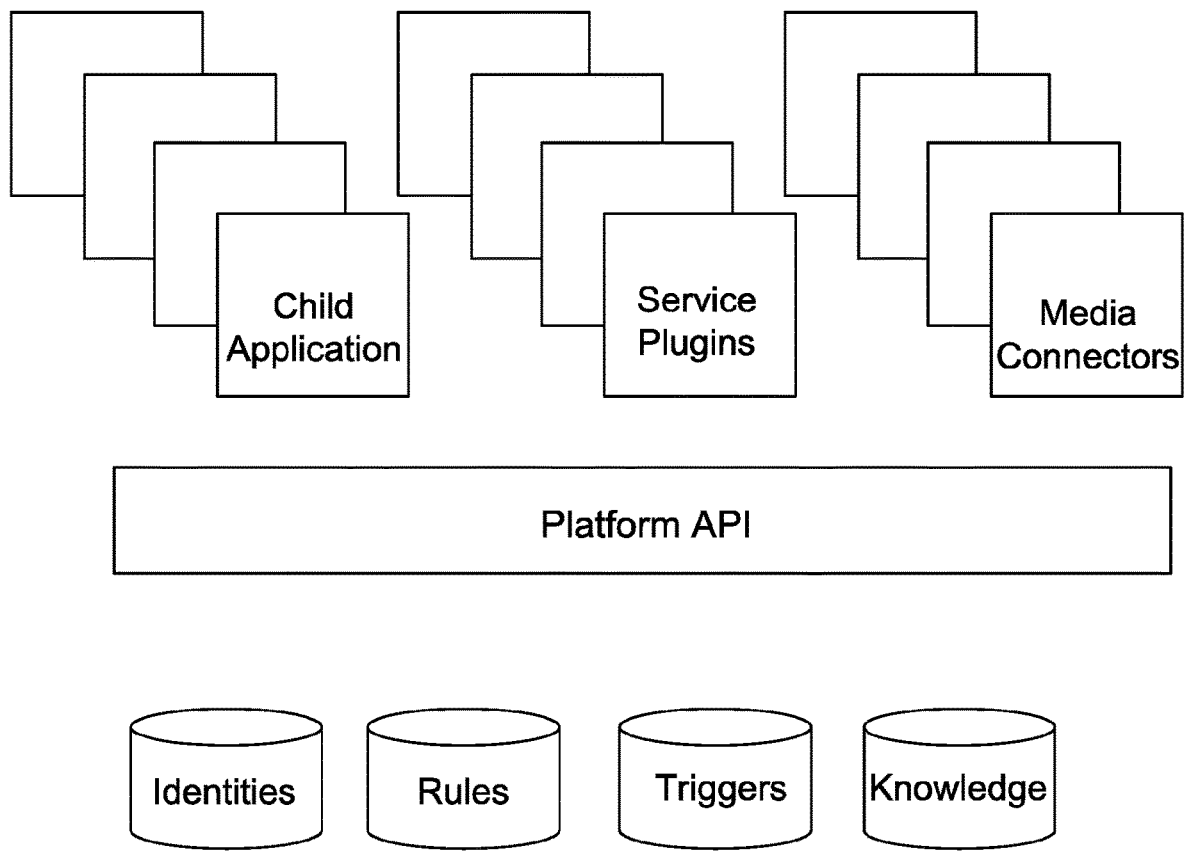

Platform architecture may include all or any of the functional blocks shown in FIG. 4c (aka the "prov2" embodiment.
The platform may include all or any subset of:
Applications, service plugins, connectors to systems, databases that hold identity roles, triggers and knowledge.

Various optional embodiments and features are now described in detail; these may be provided separately or in any combination.

Content providers may create "media knowledge objects" that link or connect with triggers (triggers that are aimed at an audience) and enable the creation of "media triggers", for example they may link a National Geographic movie about the Savanna with "well formulated" proposal for parents on how to start, and how to conduct a discussion post watching the movie. Each such item is linked to a media item, and has a target audience (there may be different "media triggers" aimed at parents of children of different ages that watch the same movie).
So, for example, a parent of a child that watches a movie may register to get proposals for "discussion areas/dilemmas/ideas, and links to references in order to encourage fruitful/educational/bonding post media consumption discussions, because the proposals are rated also by age but also by complexity/depth/etc. A parent may then simply by using the +/− . . . Or up/down or other gestures, signal to the system that he wants a simpler/more complex proposal so it may be more appropriate to his child level of development. This may also then be triggered back to the media system and enable it to better propose content to the child, and also propose more suitable content for the parent on an on-going basis.

Thus, the loop is closed, not only creating post media consumption, but also enabling parent to better tune media personalization.
Media triggers and knowledge may be stored in two ways: in the knowledge DB, or at the media provider side.

The media connector enables the system to "query" the media provider and request media knowledge objects and media triggers, in order to send notifications.

In addition, the media connector deals with usage notifications and enables the system to report usage in an anonymous way. This is done by the identity system. This provides a unique token ID per media provider (hiding the identity of users from the media providers, thus keeping their identity safe and secure).

Media providers use the token to "personalize" content for the children and to report on their consumption. They also get "usage reports" from the different client systems. These reports are anonymized by using the token ID which is unique per child—content provider (one token for one child in a single content provider, but another token for the same child in a different content provider (and completely hiding his identity info and thus hiding the family members/teachers and all trigger activities that occur from the content provider premises.

The content provider interface also enables application triggers. These triggers enable the content provider to communicate with interactive applications that run at the client side (for example on a smart TV on a mobile device, or on an IoT device) while consuming the content, and enables the content provider to close the loop with the child and push the content consumption from "lean back experience" to "lean forward/interactive" consumption. For example, while watching a National Geographic movie, it may gain access to "knowledge info" that comes from all sources (as described in the knowledge part), for example from the crowd or from experts (the knowledge content is filtered by the rules that parents apply), so knowledge content may include additional info, interesting questions, dilemmas, and educational games that encourage further thinking, stimulate the imagination, and call for further "favorable activity" (as tuned by the parents. Triggers (aimed at the child) may appear (synchronized with the broadcast) and children could participate (and while doing so their token ID may help retain their privacy.

The TV also runs the child media health (usage enforcement) system and child personal assistant (PA) system (like all other devices that he uses) so he logs in and interacts with it (getting notifications that help him schedule his day and manage his duties and activities). Therefore, the system may know that he is there and active. When the interaction moves to a different device/location/content, the system is aware of it. This enables tracking and consolidation of multiple concurrent media consumption from different sources (as may be seen by children, for example listening to music while doing homework, or listening to a podcast while engaging in another activity).

For example, a child watches TV on a smart TV that reports the consumption. The TV has several applications.

Services may be time management, content aggregation, LMS, interactive activities, online games, and other services that provide support to children, for example information databases, smart city services etc. These may connect with the child identity (using the tokenized ID for privacy), and enable smooth usability of the PA. For example, a child registers for an afternoon activity. The activity manager publish schedules, notifications, badges (certifications) triggers and knowledge (as described above). This all meshes into the knowledge and rules system that triggers the child and his parents/family/teachers. Service plugins such as media plugins hide the user from services and enable read write/send receive and query and data publishing across boundaries and into the trusted area that manages the child's PA, media consumption management, and triggers around them.

Typically, there are interfaces (APIs) for each of the players or roles e.g. parent, formal teacher, informal educator, content provider, knowledge area expert etc., and this is a platform that enables to register applications that do the different roles. Each app registers with the platform and then may either use a connector API (as described herein) or use the direct API that stores the data in the knowledge, rules, triggers and identity DB. The applications register for triggers, may create, consume and update objects from the system (based on rules approved to the app during registration. Applications interact between each other by registering to triggers, by passing data to and from the knowledge system. When an app wants to interact with a second app or service regarding a child, the system may translate the identity of the child from the token ID that one app has, to the token ID of the second app. This may occur for approved inter app connections.

The children's communication subsystem described herein may interface with a usage big data repository, an anonymization subsystem, and a big data analysis subsystem.

Examples of Analysis Output

A combination of media usage patterns published research and knowledge expert input may enable triggers that may recommend on content personalization, triggers that may draw parent attention to a child's special behaviors such as a hint that a child may be gifted in some areas, and recommend considering ways to unleash the child's potential, as well as may hint at suicidal potential for a child, and recommend a course of action.

A content provider or media provider may interact with the system in any suitable manner. There may be a "crowd" or "trust" based automatic way to label content item as educational vs. pure entertainment, suitable for age x, etc. The crowd may add knowledge items tagging, labeling and adding metadata to content, thus rating and adding the proposed triggers such as what to do after, what and how to discuss pre and after watching, where to go, proposed merchandising, and so on (prepare a list of proposed triggers, e.g.).

Models may be built where content is promoted and together with/around the content, and the profit is shared with the content providers. For example, a grandmother wishes to buy an educational game that may complement the activities that her grandson is taking. She consults with the tool that (while keeping the privacy of the child) enables her to combine media consumption information from different media providers, information published by the teachers of the child (like syllabus, schedules etc.), recommendations provided by the crowd and big data analysis, and she comes up with a recommended present that she orders on-line for him for his birthday.

At least initially, the experts in the system may be professional experts in several domains such as education, psychology, medicine, physical activity, therapists etc. They may become such by getting an identity from the system and/or by getting crowd elected.

Experts then join groups of experts (which hmay be managed by peers, for example such as Wikipedia).

Parents select the expert groups they follow, or specific experts. Experts may publish their identity.

It is appreciated that the specific implementations shown and described herein are not limiting. Alternatively, or in addition, the provided platform and interface may perform or facilitate all or any subset of the following:

1. A platform and interface that enable a relationship between the parents/family and the child.
2. A platform and interface that enable communication between the family and television channels/media interfaces such as: website, application, etc.
3. A platform and interface that enable a relationship between the family and the formal and informal educational system.
4. A platform and interface that enable communication between the child and television channels/media interfaces such as: website, application, etc.
5. A platform and interface that allow a connection between the child and the informal/formal educational system.
6. A platform and interface that enable communication between parents/family and databases related to the child e.g. school educational reports, municipality database, smart ID etc. Enables authorities to add an additional layer of information to the media ecology.
7. A platform and interface that enable the parents/family and child to connect to IOT (Internet of things e.g. GPS on a child bag/tag, pedometer, health app etc.).
8. An interface/platform that enables a one time or a continuous interaction with pre-approved members of the platform (may enable the same interaction as other interfaces e.g. 7 above).

Typically, the platform facilitates efficient contact between parents/family and their child. The platform allows the family to both define and connect with the secure identities of their child i.e. Child x belongs to family y.

Other authorized identities are defined as siblings, grandparents, uncles etc. (similar to the e-mail address book Patent mentioned above).

Functionality: a parent-controlled system that allows for the family's constructive involvement in the child's media consumption.

The system may include all or any subset of the following functionality/ies:

1. Build a media plan for the child: the family selects the content/viewing times/viewing sequences/restrictions (e.g. child is permitted to use the platform for x hours/minutes/no more than x minutes per day, on weekdays/not more than x on weekends, not before x o'clock, not after y o'clock. This includes the recommendations made by experts e.g. shutting down of screens x hours/minutes before bedtime.

Allow parents to control content viewed e.g. child is only able to view calm content accompanied by calm music before bedtime/educational programs before school etc.

2. Parent approval system: parents may approve or disapprove of the content the child has selected to view from a bank of options i.e. allow child x to view y (yes/no?).

If the parents have more than one child using the platform, each child's parameters and restrictions may be personalized i.e. child above 5 years of age is permitted to view x, child younger than 5 years is not permitted to view y. Parents may rate what they feel is suitable viewing for specific ages/developmental levels and parents may receive recommendations via these ratings and via crowd engines. Approval is permitted in accordance with preapproved schedule of the child.

3. The parents/family may receive a report that details the child's usage of the media i.e. time spent, content viewed, areas of interest, repetition (i.e. viewed dinosaurs x times). The platform also offers expert recommendations based on a big data analysis.
4. The platform enables control of all authorized parties, to each parent separately (i.e. divorced/separated parents, grandfather/mother/guardian. This allows the platform to be modified to build personalized media ecologies according to the needs of the key figures in the family.
5. Sharing: the child may share content that he/she has viewed with the parents and other family members according to the address book defined by his/her authorized family members, and according to the options provided by the platform—e.g. child is only permitted to send grandma 5 emails per day etc.
6. Promoting dialogue: the platform may make recommendations to the family based on activities/content viewed by the child, e.g. promotes continued dialogue at the appropriate developmental level of the child by making recommendations as to what else the child may do with specific content viewed (e.g. if the child has viewed certain content regarding dinosaurs, recommendations made may include recommending the family to read a specific story to the child, listening to specific music, visiting a museum, creating a model of a dinosaur etc.). It may also recommend the next pedagogical level appropriate for the child i.e. recommending child to view series 2, or view the next chapter.

7. The platform allows sharing between authorized members i.e. preparing and editing a video, creating a quiz/trivia on the viewed content etc.
8. Possibility to build a 'family vision'/'family media ecology' for each member of the family i.e. the 5 year-old may watch TV until 18:00/the 13 year-old may watch TV until 21:00.

The content may be personalized for each child according to subjects such as art, nature, science, technology, mathematics, languages, etc.

9. The option for the family to build a 'family media profile'. This is achieved by the family completing a comprehensive questionnaire that enables them to set their expectations. Data is analyzed by experts or by AI. This provides a mechanism that builds expert recommendations following smart analysis of the parameters (enabling a human mechanism and enabling a smart algorithm development).
10. Create a personal child/family play list. This connection is based on the assumption that the platform allows users to authentically identify their family environment.

Typically, the platform facilitates contact between the family and television channels and/or media. The platform or system may support building a customized system or platform based on personal characteristics of the family and may be tailor-made according to different criteria which may be stored as metadata e.g. all or any subset of age/gender/religion/interests/cognitive abilities/family ideology/emotional needs/developmental needs.

The platform may be operative for storing and application of family's communication requirements e.g. all or any subset of: specific days/hours/viewing places/end devices/network access parameters i.e. Wifi, wired connection, reception level etc.

All or any subset of the following may be provided:
1. Ability to control the channel viewing menu or complementary media such as a computer.
2. Ability to plan details e.g. see chapter x before chapter y.
3. Create a personal play list approved and controlled by parents/authorized family members (including follow-up proposals)*.
4. Option of identified users to rank content. Rating on the parameters that the media offers: this includes the quality/content/personalization (on the commercial level, there is a revolution here that says instead of measuring ratings that sometimes do not reflect what is happening e.g. the television is on in the background and or is muted, parameters are measured that contribute back to the industry. This is a significant improvement on the focus groups built by suppliers).
5. Sharing content with one, several or all family members.
6. Option to share content with communities e.g. all parents who want to travel to the north in the school holidays/all parents who want 'green' education etc.).

Possibility of creating a community around a play list or content.

7. The family may receive reminders in another media format, e.g. in 5 minutes, start the chapter you are waiting for. Possibility to reveal promotions.
8. Encouraging a healthy lifestyle by gamification—goals to be set by parents or experts to encourage outdoor motor activity after every x minutes of media consumption e.g.: walking in the park, cycling, playing in the park, exercising with a parent etc. This may be defined as a balance between screen time/green time. Parents may receive reports: e.g. child watched an hour of x and walked for 45 mins in the park.

Typically, the platform facilitates formal/informal/TV education system contact. The platform typically enables secure identification of users, their family environment and the media (including the device they use).

Certain embodiments may include providing or building a custom system (creating a legitimate use of after-school media).

All or any subset of the following capabilities may be provided:
1. The platform enables the synchronization between educational content and entertainment content and additional content chosen by the parents.
2. Adapting media content to the curriculum according to subjects (response to and completion of the curriculum demands).
3. The platform allows flexible viewing hours/program selection/customization.
* adapting to children's characteristics (content levels/hours/various learning/accessibility/personal/family characteristics).
4. Possibility of integrating content-based learning games "edutainment"
5. Possibility of creating a feedback system for the educational system/parents and vice versa-recommendations to the teacher/parents following big data analysis and use of the learning system.

Typically, the platform facilitates functioning vis a vis the formal and informal education system:
1. Personal/direct contact—while contributing to the platform's construction: family preferences (again ideology, time constraints, money, emotional/physical appeals, challenges) on the assumption that parents know their child best and therefore parameters are set by the parents. and/or
2. Managing parental involvement. At the level of task reporting on challenges where parental encouragement is needed, recommendations for parents about joint activities/guidance of the school staff/professionals, by defining needs and coordinating expectations. The platform not only facilitates communication, but also creates conversation around content/long term planning (including setting personal/family/educational goals).

Typically, the platform facilitates contact with a child vis a vis the formal/informal education system, with an optional possibility of sharing all educational partners (education system, community, parents and family, children).

All or any subset of the following functionality may be provided:
1. The possibility of building a personal program by the educational staff according to the child's preferences.
2. Creating personal adjustments for the child and receiving feedback from him/her to the educational authorities.
3. Creating an alternative evaluation mechanism that may allow the staff to gain insight into how the child is performing from an educational point of view.
4. Creating an interactive practice following a child's completing of a series, program, etc.
5. Planning and creating continuity between school hours and afternoon hours with the ability of computerized control.

The system herein may also comprise a computerized sub-system, typically with communication functionality e.g. social networking and/or email, for children users, which may be constructed according to any of the embodiments or variants or features, in any combination, in any or all of the patent documents below all of which are incorporated by reference:

US patent document no. 20180136903 describes a computerized system including rules for a rendering system accessible to non-literate users via a touch screen including a computerized system operative to perform selectable system-actions responsive to user input, the system being accessible to non-literate users via a touch screen defining touch screen locations respectively corresponding to the selectable system-actions, the touch screen being operative to detect and distinguish between first and second gestures, the system comprising a processor-controlled touch-triggered actor which, responsive to at least each first gesture applied by end-user to an individual location within the touch screen, from among plural touch screen locations, performs individual action/s which correspond to the individual location; and a processor-controlled touch-triggered oral presenter which, responsive to at least each second gesture applied by end-user to an individual location within the touch screen, from among the plural touch screen locations, presents an oral characterization of individual action/s which corresponds to said individual location.

US patent document no. 20180114461 describes a secure computerized system, method and computer program product for children and/or pre-literate/illiterate users typically including a secured computerized social networking system for pupils including a mail server operative to interface with a secured parent environment; and a secured pupil environment, the system comprising a computerized environment secured to prevent access thereto, other than by end-users who have passed a what-you-know authentication test; a what-you-know testing functionality; and a graphic what-you-know test-configuring functionality, the system being operative to perform a plurality of selectable system-actions responsive to user input, the system being accessible to non-literate users via a touch screen defining a plurality of touch screen locations respectively corresponding to the plurality of selectable system-actions, the touch screen being operative to detect and distinguish between first and second gestures, the system comprising: a processor-controlled touch-triggered actor; and a processor-controlled touch-triggered oral presenter.

U.S. Pat. No. 9,871,798 describes a Computerized System Facilitating Secured Electronic Communication Between And With Children typically including a mail server operative to communicate with external recipients via a gateway to external communication network/s; and to communicate with internal recipient/s including pupil end-users via an internal secured network. Associations between individual parents who are nodes in external communication network/s and pupil end-users; and white-lists of authorized communicants for individual pupil end-users, are stored. A whitelist provided to memory for a first pupil end-user includes a second pupil, if and only if the first and second pupils' parents have both, via respective parent user-interfaces, authorized communication between the first and second pupils.

US patent document No. 20170187717 describes an improved computerized system facilitating secured electronic communication between and with children typically comprising a mail server operative to communicate with external recipients via a gateway to external communication network/s; and to communicate with internal recipient/s including pupil end-users via an internal secured network. Associations between individual parents who are nodes in external communication network/s and pupil end-users; and white-lists of authorized communicants for individual pupil end-users, are stored. A whitelist provided to memory for a first pupil end-user includes a second pupil, if and only if the first and second pupils' parents have both, via respective parent user-interfaces, authorized communication between the first and second pupils.

The sub-system for children-users may be harnessed to generate big data regarding children users from which insights may be derived as to the children's abilities and/or preferences and/or characteristics, such that content and/or rules according to which to serve that content may be selected for or tailored to individual children. Other factors which may affect selection of such content and/or rules may include, alternatively or in addition, parental inputs e.g. as described herein.

Any suitable scheme may be provided for defining trusted media providers (or trusted knowledge area experts or other trusted entities). For example, an initial set of trusted media providers may be provided manually or from an external source. Then trusted media providers or the crowd or other suitable criteria may be harnessed to define additional trusted media providers (or trusted knowledge area experts or other trusted entities).

Any suitable scheme may be provided for creating entities for students or children and/or for linking the students or children to other end-users such as family members and informal (or formal) educators. For example, a trusted computerized entity such as a ministry of education or local authority or board entrusted with running physical schools for children may provide such entities and may also define rules according to which existing entities are entitled to create other entities and/or links e.g. an end user defined as a parent of child x may be defined as being entitled to create links for child x. Such schemes are described e.g. in the above-referenced published patent applications.

The logic governing interactions between various end-users may take into account a parent's parenting ideology as defined by the parent and/or as derived from automatic ideological categorization of content. For example, a parent may define his parenting ideology e.g. via a suitable user interface which may include a menu of parenting ideologies, as being one or more of: pro-environment (green), or interested-in-mathematics, or preserving-family's-Chinese-language-and-culture, or Roman Catholic, or soccer-fans, or this ideology may be deduced by the parent's interaction with the platform. Then, at least a default interaction with the child end-user, unless modified by a parent, may be governed by rules specific to the parent's ideology/ies e.g. Selection of content items to be presented to a given child might take ideology into account as well as one or more of: what the child is learning at school this year or week or month, which data may be uploaded into the system, child's age, gender, cognitive ability.

Figure 2:
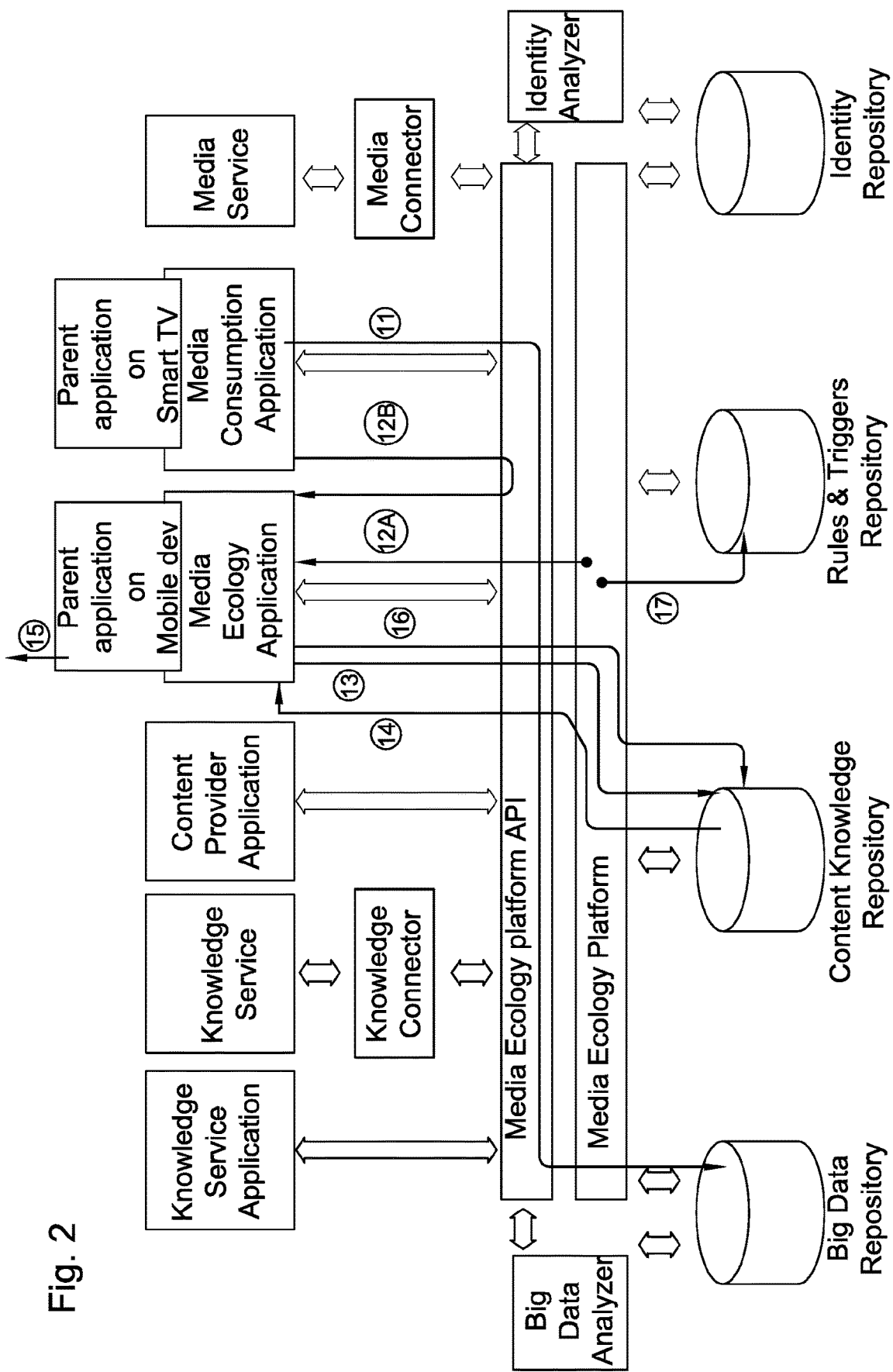
Figure 3:
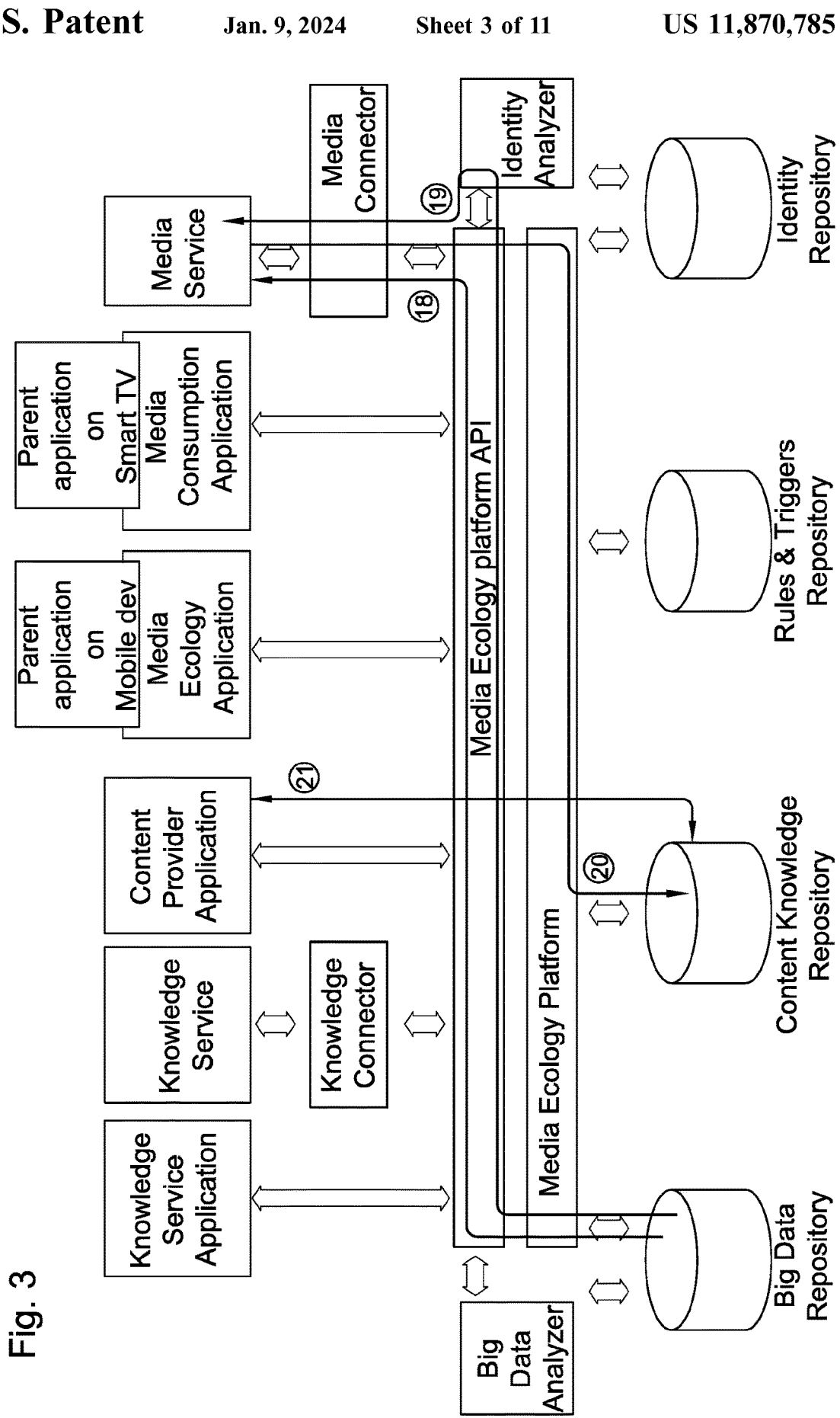

Two example embodiments are now described which are useful e.g. in conjunction with the systems illustrated in FIGS. 1-3 aka, respectively, drawings a1, a2 and a3.

Each embodiment may include all or any subset of the operations which respectively follow:

Embodiment i

Child Consumes content—parent gets notification with knowledge info (example—your child just finished watching a video about a frog; ask him what a frog eats. Also you may learn more about the area and see more proposals in the following link . . . ) The parent may request info at higher level This may reflect on the personalization of the content the child watches and the knowledge that the parent gets in the future
1. Child application identify and includes content application ID.
2. Token (paired to app ID) sent back.
3. Child applications pulls rules and registers for triggers (for this child).
4. Parent identifies.
5. Parent gets parent and child token ID.
6. Parent application pulls rules and registers for triggers.
7. Optionally pulls from the platform the active child application presence and registers rules and triggers for the child.
8. Optionally parent application registers triggers directly on child application.
9. Child request content.
10. Optionally media requested directly from media service (token ID may be passed with the request enabling personalized service).
11. Child client application reports start of media consumption.
12. Event is triggered near the end of media consumption.
12b. Optionally an event is triggered near the end of media consumption.
13. Parent application collects data.
14. Data is returned to the parent's application.
15. Client application notifies the parent about the consumption with knowledge info about it.
16. Parent application requests information at a higher level.
17. The platform modifies rules reflecting that the child needs a higher-level content.

Embodiment ii

Content provider collects usage information and uses it to add content knowledge. Content lineup updates at content management system—the content management media service uses the media connector to update the schedules and the content descriptions and its meta data and the knowledge about it. Operations may include all or any subset of;
18. Content provider collects anonymous usage information, and/or
19. Content provider collect anonymized usage information, and/or
20. The Content provider's content management system uses the media connector to update the schedules and the content descriptions and its metadata and the knowledge about it;
21. and/or content provider uses the content provider application to manually insert and modify content knowledge items.

It is appreciated that child end-user ages may be partitioned into ranges e.g. (2-3) (3-4) (4-5) (5-6) (6-7) (8+) (12+) or may be overlapping e.g. in some embodiments, it may be permissible to have some content items with a 6-8 year range and others with a 7-10 year range.

FIGS. 5-13 are now described in detail.

It is appreciated that Persistent Objects may be stored in tables in a central database aka PersistantPlatformObjectsDB serving all users e.g. a relational DB such as, say, MySQL or Microsoft SQL Server. For performance and reliability reasons, the term "database" as used herein may be stored in several servers some of which may be clustered. usage data may be stored in Databases suitable for big data like MongoDB or cloud based service like Amazon AWS data warehouse solutions or the Microsoft Azure equivalents. an XML DB may for example be used. All or any subset of the tables described below may be provided.

The Platform of FIG. 4c typically has plural activities and plural CLTGs as shown. The platform typically uses the tables described below, and in addition, exposes API that provides the data that is stored in the tables to the implementations of Activity, CLTG and the other components or objects described below.

For example, an Activity Object table may be generated and stored in memory, which describes an Activity that the adult and child perform together. types of activities may include, say, Book reading, Games, Music, Arts and Crafts, Personal questions, Riddles, Songs & Music, VR/AR adventures or virtual/augmented reality-type activities.

Some types may be divided into sub areas or subtypes e.g. plural sub-types of "Personal activities" such as, say, Personal questions, Trivia, Wishes for the future. Or, a "Personal Acquaintance" area or activity may include plural subtypes such as, say, Personal Acquaintance, Family story, Family Root tree The activity may be configured to create an environment where the adult and child operate together, e.g. simultaneously, however, a single activity may simultaneously be presented in one form to the child and in another form to the adult. For example, a chess game shown to one of the parties may include in the display screen a chesspiece name superimposed on each chess piece's image (e.g. "pawn" superimposed on each image of a pawn in the display screen) whereas this would not be included in the other party's display screen due to her or his greater familiarity with the game. while the adult and child's respective user interfaces and underlying respective logic layers operate, the system may propose Cultural Literacy & Life skills Training Guidance (CLTG) to the adult and/or child that may enhance/deepen their level of interpersonal communication. E.g., after the Adult Logs in, the system typically allows her or him to choose an Activity from a menu of High level Activities such as book reading, games, music; these activities typically have an ActivityParentType=0 attribute.

The menu may float atop a communication Layer.

Typically, when the Client software is activated it creates a "Main UI Object" that is used for the user to operate the system, This is used for logging in, for starting a session (preparing for a call and connecting it . . . )

This layer is the one that starts the communication layer (and using the comm layer API) calls the other party and connects the communication session.

The MainUI Object shows UI from which an activity may be chosen and then activates the activity, after that it may create the overlay ui for the CLTG. This part of the software serves as the "Glue" that connects and synchronizes the different layers in the system (communication layer Activity Layer and CLTG layer).

There are typically 3 layers of UI All or any subset of which may be provided:
1. On top of all appears the CLTG UI (e.g. as an overlay or side by side)
Because this is a platform, each layer may expose capabilities and the system operates based on the exposed capabilities. So if the communication layer supports overlay mode and the Activity supports overlay mode the system may show the ui in overlay mode however if the activity does not support OverlayMode the system may show it side by side with the communication layer. The screen may be divided and the images may become smaller.

There may be a second option to spread the communication between 2 devices for example do the Audio/video communication using Amazon Echo Show devices And run the activity on Tablets.

Overlaying UI and SideBy Side UI is typically still in place e.g. for how the CLTG UI may overlay the Activity.

Figure 11:
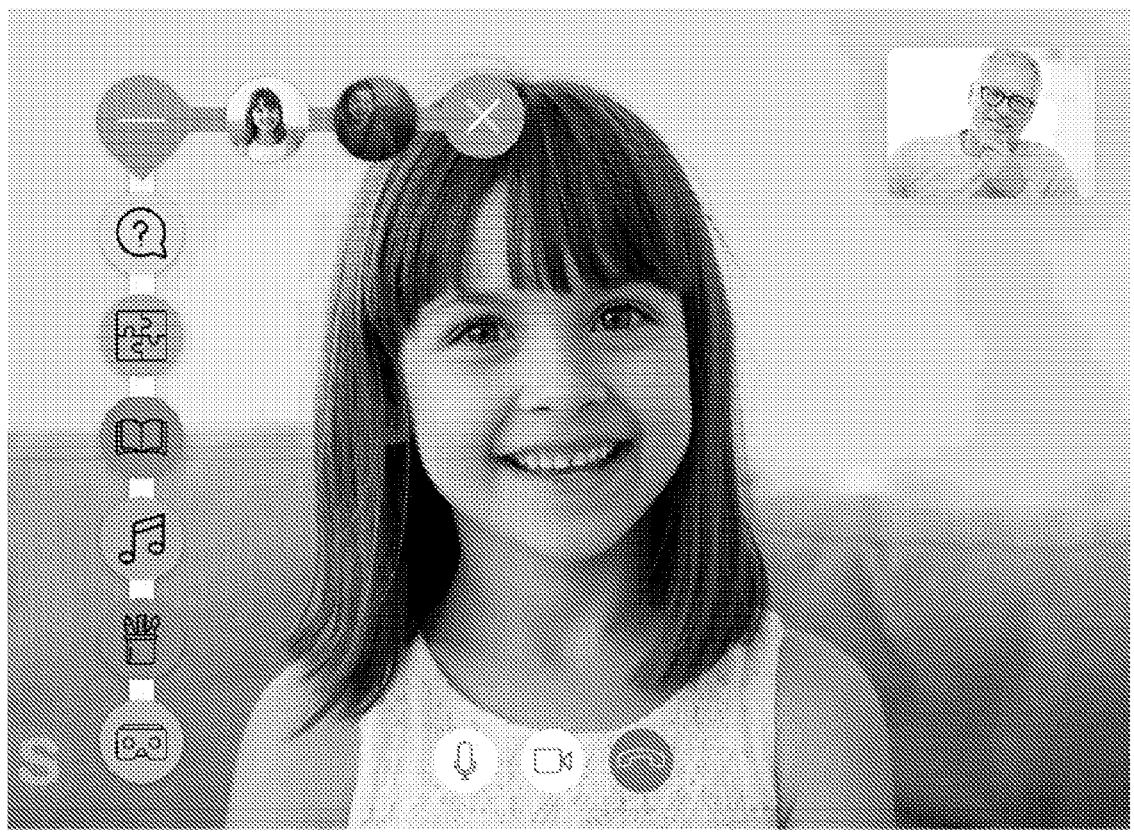

This UI implements the dialog elements of the CLTG. as illustrated herein, an adult user e.g. grandparent may see a grandchild image in large occupying most of the screen and the grandparent (or other adult's) image appears in a small rectangle); a round button connected with a thin stripe may appear over the image of the grandchild on the top left side, for example in a transparent frame on top of SKYPE e.g. as shown in FIG. 11, which is a Skype image of a child (called Taylor herein) with a menu floating atop, and/or may float, later, on top of the display screen of the running activity e.g. a display screen showing a game board, quiz, or "game outcome screen" which may, say, show the child's and/or adult's score on a game, or a message describing an activity's outcome such as "Neat! Taylor found all 5 objects on this page". Thus, the adult may see several icons superimposed over the child's image, on his screen.

Any suitable technology may be employed to interface with skype to achieve the floating effect e.g. overlay.

For example, if communication software that provide this functionality (via propriety APIs of the communication software) is used, such as e.g. SKYPE but typically alternatively or in addition refers to the Activity for example the book reading activity may expose overlay capability so CLTG UI may appear on top of it. The communication software APIs may be used to show a transparent window on top of the main image; buttons may be added and the activity may later be allowed to draw into that place. It may be possible to use the "shared desktop" feature programmatically and draw directly into it. When this is not possible, a window may be created and a browser may be run in the window (e.g. like an Iframe). The system may run the communication software in the web browser in this window and a second frame may be generated, atop that window, that is the overlay for the menus and activity to run in.

When selecting an Activity that has sub activities (e.g. where there are ActivityType entries with ActivityParentType=Selected ActivityType) the system may display a sub menu. Thus, for example, choosing, say, the book icon in FIG. 11, corresponding to a bookreading activity, may lead to a display or other presentation, to the adult, of the bookreading activity's sub menu e.g. of the sub ActivitiesType, which may include various icons corresponding respectively to, say, "new on the shelf", "classics", "recommended for me by my friends/family", "books liked by other kids like me", etc.

Sub Activity type may also be used for selecting other sub activities. For example there may be a sub activity type that enables to select Stories by using a recommendation engine. The recommendation engine may have access to stored indications of all or any subset of: Activities preferences that have been set for the Adult, Activity preferences that have been set for the Child, Other preferences set for the child like CLTG or Cultural literacy & Life skill Training Guidance preferences and other recommendations that the system may propose. AI preference algorithms may be applied, which take in account the private and global usage history and preferences combined with Big Data analysis and Content from content providers e.g. as described herein including with reference to FIGS. 1-3, 4a. Typically, privacy is maintained despite usage of this Big Data.

Examples of suitable preference algorithms are described in https://www.quora.com/What-is-preference-Learning-And-how-is-it-different-from-machine-learning Fürnkranz, Johannes; Hüllermeier, Eyke (2011). "Preference Learning: An Introduction". Preference Learning. Springer-Verlag New York, Inc. pp. 3-8. ISBN 978-3-642-14124-9.

Fürnkranz, Johannes; Hüllermeier, Eyke (2003). "Pairwise Preference Learning and Ranking". Proceedings of the 14th European Conference on Machine Learning: 145-156.

Gemmis, Marco De; Iaquinta, Leo; Lops, Pasquale; Musto, Cataldo; Narducci, Fedelucio; Semeraro, Giovanni (2009). "Preference Learning in Recommender Systems" (PDF). Preference Learning. 41: 387-407. doi:10.1007/978-3-642-14125-6_18. ISBN 978-3-642-14124-9.

Active Algorithms For Preference Learning Problems with Multiple Populations Aniruddha Bhargava, Ravi Ganti, Robert Nowak, which modeld the problem of learning preferences of a population as an active learning problem and describes an algorithm which may adaptively choose pairs of items to show to users coming from a heterogeneous population, and use the obtained reward to decide which pair of items to show next.

The Event where a CLTG occurs while running the application is considered herein a Cultural literacy & Life skill Training Guidance trigger or CLTG trigger.

When the Adult selects an Activity, the Adult end-user's ui typically enables him to view and or select from among plural CLTG objects that may be available for the activity (selection may be specific and/or preference algorithms may be employed for proposing an activity) and then the Activity is Activated. Activating an activity includes registration by the system of the selected Cultural literacy & Life skill Training Guidance triggers or CLTG triggers so that the activity may be able to "fire" them. Once Activated, Activity typically has one of 4 modes:

1: ActivityOverlay mode—where the background is the communication layer and the activity overlays the communication layer e.g. as shown in FIG. 11.

Figure 5:
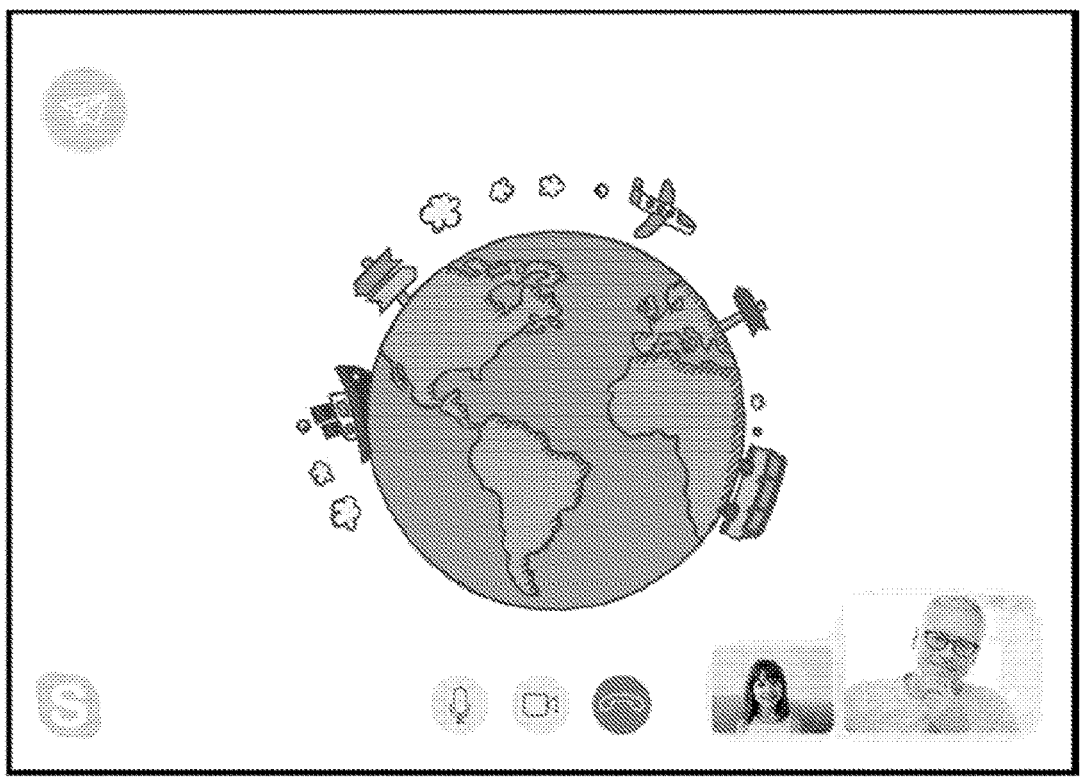

2: CommunicationOverlay mode—the communication layer overlays the activity e.g. as shown in FIG. 5. The place and size of the communication overlay may for example be a preset parameter by means of a property of the activity Object or may for example be dynamically set by the Activity.

typically, the system supports either or both of 2 ways of integrating the Activity UI with the communication layer (eg SKYPE).

1: when in Overlay mode, the UI elements (buttons, Text, Images . . . ) may, say, appear on top of the Image produced by the communication layer (overlaying it).

2: in SideBySideMode, The screen may be divided such that the Communication window is minimized and the Activity UI and the communication layer UI (e.g. images of grandchild and grandpa+communication layer UI) appears side by side The same terms may be used also for overlaying an activity with CLTG dialogs.

3: Mixed mode—where the activity may dynamically or programmatically switch between ActivityIsOverlay mode and CommunicationOverlay mode.

Figure 6:

4: VideoCommunicationOff mode—For example when the Activity involves Augmented reality the video image portion of the communication layer may be provided by the Augmented reality aka AR system. by disconnecting.

either of the following 2 ways may be used to achieve this effect—
1. InLineMode where The AR. Software captures the video from the camera, Modifies it and streamlines its output (the modified video with the AR objects) to the communication layer (the communication layer sees it as the stream coming from the camera—however it is typically modified by the AR software before it gets into the communication layer)
2. Disconnect mode—Where the communication layer gets a command to stop transferring the video across the 2 sides and the platform described herein takes care of transferring the video So the AR software captures the camera and the video stream created by it is transferred to the other side and displayed.

the video portion of the communication layer, bandwidth and/or processing resources may be freed for the Augmented reality aka AR to process and push the video streams e.g. in order to replace the background and/or add floating objects e.g. as shown in FIG. 6 in which a forest background is replacing the previous background e.g. the wall or furniture etc. which the camera imaging the person actually saw behind the person. In some simpler AR scenarios, a green (say) screen may be placed behind the person as is known.

further, in FIG. 6, floating objects such as eyeglasses and a wig, have been superimposed onto the child's image.

Some or all Activities may have
   a. private Meta Data such as, say, a book's title, if the activity is a book reading activity. the private meta-data describes that activity's parameters, or may describe parameters for activating the parameters for its operation and/or
   b. descriptive Meta data describing the activity e.g. "Book reading for ages 5-6", to categorize the Activity; this metadata may be used during activity selection and recommendation e.g. as described herein.

When Activating an activity the system typically uses an ActivityActivationBlob of the ActivityType of the activity to determine how to activate the activity. the system may use an XML Element ActivityType to determine the type of activation (e.g. WebApp, App, IntegratedActivity, . . . ).

The ActivityActivationBlob typically comprises a chunk of data that is not used by the system other than passing this chunk of data, as is, to a called object.

This may include applications/Web applications/Local libraries; each has a different way of activation:

Application is typically executed as a process. And the system transfers to it parameters e.g. using the native way that the OS below exposes. Web apps are typically executed in an Iframe and receive their parameters from their calling URL Libraries expose An "ActivityObject" that expose a "Start" method that get the start parameters.

They are typically activated by the MainUI object when an activity is selected from the proposed activity tree.

The proposed Activity tree is typically created based on the selected activity types that the user selected while taking in account the activities that have already been performed, and/or the feedback that has been gathered on the performed activities and then also trying to find CLTGs that fit the Child The blob is used to transfer data, internal to the Activity, into an Activity when that activity is activated. a blob may be defined the blob may have any suitable data structure; generally the implementation depends on the type of the activity. in many cases XML in other cases by forms of web params string typically, the Main UI object takes it and pass it during activation/when the activity is defined. see the description of this ui, according to certain embodiments, above.

For example, the blob may indicate to the activity that it has been activated from a given platform e.g. "the Bondee platform" or mark the way that it may behave e.g., depending on the type of activity:

For Process—it may have the form a CLI format (see e.g. https://en.wikipedia.org/wiki/Command-line interface) On some platforms it may have the same form as WebApps: So it may be of the form of URL+QueryString (See WebApp)

For WebApps—it may have the form of URL+Query string format (see e.g. https://en.wikipedia.org/wiki/Query_string)

For activity exposed by a Library parameters may be formatted as XML string passed to the start e.g. as described in the Wikipedia entry for "query string".

Method as a parameter is another possibility.

Any suitable technique may be used to id a specific game. For example, the ID may be hidden in the Activity Start command. Each Activity has an ID and it's properties are stored in the Activity record. When the Main UI needs to activate an activity it Looks at the Activity type (by looking up the ActivityType from the Activity object in the ActivityType table ActivityCode) Each Activity Type has ActivationInstructions that are coded in the ActivityActivationBlob (See details in the field definition there) it takes the Activation Blob from the ActivityType object and uses it to activate it. In addition it passes the parameters from the blob mentioned in the Activity type object as well as the parameters from the Activity Objecty. For Example A BookReading Activity may be described by an ActivityType and a Specific Book may be described by an Activity by means of the book name passed as a parameter mentioned in the activity object.

By for example (for WebApp) creating an Iframe and in it browsing to the Url+Query string as described in the activation Blob So For example, Lets say that we have an Activity that enables us to read a specific book Lets say it's the "Ugly Dicklin" So we want to start the "BookReading" application and give it as parameter BookName=UglyDucklin and we want to start it in DesignMode (to set the spots in for this specific Book.

The designer may execute the ActivationBlob

Alternatively or in addition, when there is an Activity component that implements games, the specific game stored in association with a unique game-id typically along with the level of the game that is to be used may be passed to the activity as internal parameter/s within the blob; the level is typically determined when designing the Activity with the Designer (that is a utility that is typically used to fill the Objects, e.g. in the ui.

For each type a suitable form of activation may be used. For example a web app may be activated by opening a web window and browsing it to the url provided by the ApplicationURL element. App may be started in a new process, IntegratedActivity, may be started by creating the proper page and navigationg to it . . . ), as part of the activation it typically passes to the activity all or any subset of the following parameters (assuming, say, use of XML): ActivityActivationParameters (XML element that include activity specific parameters—e.g., for a book reading activity, this may include book title and/or book content location (e.g. the precise page, and word on that page, which was last read out in the last book-reading session between a given adult and child) or a state of the game for example, in chess, the chess-piece if any occupying each of the 64 squares In addition a list of ActivityCLTGtriggers is typically passed.

Fields may include all or any subset of the following:
ActivityID (GUID) unique id of this activity (unique key)
ActivityName (Text)
ActivityType (int) code of the activity type e.g. as described in the ActivityType objects repository.
ActivityCommunicationRelationship (int) may include all or any subset of the following:
  (1: ActivityOverlay mode,
  2: CommunicationOverlay mode
  3: Mixed mode
  4: VideoCommunicationOff mode)
ActivitySupportedTriggerSpotstypes (int) may include all or any subset of the following:
  (0: Non—supports only pre activation and post completion triggers by means of relative 0 and or 100 values.
  1: Relative (supports all values 0-100)
  2: Dynamic (supports dynamic spots) and pre and post run
  3: Both (supports both relative and dynamic trigger spots
ActivityActivationParameters (XML) may include Private metaData represented as an XML element that holds private meta data that is passed to the activity upon activation
ActivityPlatformParameters (XML) may be passed to the platform when activating the Activity Private meta data represented as an XML element that holds private meta data that is passed to the platform upon activation of the activity. This may for example hold the locations and/or size of the communication windows when in CommunicationOverlay mode, or location of overlay Menu on top of the Application if in non integrated TriggerMode.

ActivityTriggerSpots table:
ActivityTrigger spots describe the location within an activity when a trigger happens.
There may be types of spots e.g.:
  a. Relative spots represented in % where 0 is before the activity starts, 50 is in the middle of the activity and 100 is after the activity complete; and/or
  b. Dynamic spots—defined by the activity and represented by the activity using a variable size binary blob which may for example contain an XML element that describes the location of the spot using Activity specific notation.
    Any suitable activity may support these types of triggers.
    An activity Trigger author may use a platform tool that enables him to create ActivityTriggers. The platform tool aka trigger development tool may be provided by the Platform E.g. the platform of FIG. 4c, and enables a creator of triggers for example a psychologist to scroll through a book (which is typically defined within an activity object) and point at a location (page, line and/or word within the page) or otherwise define that location as a place for a trigger. Then the author creates the trigger data to be associated with that location, for example a recommendation to ask the child, at a certain place within the text of a story about an ugly duckling, "what would you feel if you were in the place of the ugly duckling. Or, a Math teacher end-user might add a level 1 question (how many flowers are in the drawing? And a Level 2 (harder) question (are there more flowers then butterflies in the picture?) at a single location. This tool typically enables development of triggers to be decoupled from the development of activities thereby to generate a marketplace for of Triggers and even get UGC triggers. Responsively to the operation of the trigger development tool, the data (aka content) and location of the trigger as defined by the tool, are stored in a suitable table e.g. as described herein.

Typically, the Pltform looks at the ActivitySupportedTriggerSpotstypes Field to determine the supported types of triggers that the activity supports. For example, perhaps for type 0, it enables defining 2 types of spots (pre run and post run). Perhaps for type 1, it enables description in % of the spot.

For type 2 (dynamic) it perhaps activates the activity (e.g. as in the activity description, e.g. as herein) e.g. with a Parameter: TriggerDesignMode=True and/or a Parameter "TriggerSelectedCallback" Pointing to the TriggerAuthoringUtility. This Activates the Activity in design mode. Thus the activity starts and typically enables a button aka "Mark Spot Button". depending on the capabilities of the Activity it may be able to show a "Mark Spot Button" as part of an activity UI (when in "design" mode—which is enabled during activity activation via a parameter DesignMode=true. by the designer . . . When the activity doesn't have this capability (but still supports "design" mode), this button may appear in the toolbar of the designer tool of the platform. This may enable it to appear outside of the Activity Window.

Typically, a Trigger creator aka trigger author uses the platform designer to start an activity in "Design" mode (e.g. a mode which facilitates trigger creation). The platform starts the activity in a window and outside of that window it has controls (like a toolbar for example) The "Mark Spot Button" may appear there. Once pressed, the Designer calls the activity "Mark Spot" method. This method is typically exposed by the Activity and the platform (e.g. in this embodiment, the designer part of the platform) may call it and get back the blob that defings the spot such that the designer may mark it in the spot record. Later when the Main UI activates the Activity (e.g. as part of a session) it may give it as Parameter the Spots for which it may Trigger back specific CLTG triggers. It Marks the spot in the Activity Language by Quating or creating the SpotBlobs as passed to it by the activity.

For Example given a specific Book in Page #3, the Blob that the activity may pass may look like: "<BookName="UglyDucklkin" Page=3/> This string may be stored in the Blob as Spot #XXX. Later a Trigger may be tied to Spot #XXX. Then when Activating the Book reading Activity the Main UI may give it the List Of expected Trigger that may contain an entry for <BookName="UglyDucklin" Page=3 CLTG=1335/> Where CLTG=1335 may refer it to triggerNumber 1335 in the table. This Method is typically exposed by the Activity and used to return a string Blob reflecting the position in the Activity. This may be called By the Designer (which may be one of the user types herein) e.g. when the "Mark" Button is pressed, and gets back a Parameter blob that describes the Spot. If the button is embedded in the activity then the activity calls the TriggerSellectedCallback of the designer in order to let it know that a Spot has been defined and gives it, as a parameter, the blob describing the spot. The designer may display a list of the Spots for the activity e.g. to the end-user designing spots and CLTGs e.g. when she or he designs CLTGs for an existing Activity. For example let us say it is desired e.g. by an end-user to add a new Book to the Book reading Activity Type. So we add an Activity And mark it of type Book Reading with the Parameter BookName=NewBookName. Then, typically, the designer is opened, and, typically using it the BookReading Activity is opened, with the new Book. Now he turns to the page he wants and Press Mark to mark it. Then he adds the Triggers that are tied to that Spot.

The designer may request the Activity to "jump" to a Spot e.g. by performing the activity. At this stage the Activity has typically been activated and is active side by side with the designer=. Design" mode typically supports operations on spots such as: Create New Spots, Delete a spot or Edit (move) a Spot. Activities with the capability to host a "mark spot Button" it needs to also support showing the list of spots and modifying the list of spots (add delete and edit individual spots on the list, e.g.). There may be complex activities that expose Designer functionality and then they may show the designer functionality for showing and naming the spots and connecting them with CLTGs. In addition when the platform activates an activity that has a "Mark spot" button capability, it may transfer a list of currently defined spots for that activity as part of the activation parameters.

When the activity does not support "design" mode the designer tool enables creating trigger just before the Activity starts and after it ends.

When an activity starts and typically enables the "Mark Spot" button—the activity thus notifies the designer that activity has reached a specific spot. When the "Mark Spot" button is pressed, Activity typically uses the TriggerSellectedCallback to call the designer and pass e.g. as Parameter a blob that describes the spot. The Designer then may create an ActivityTriggerSpots.

Examples of activities and what might be a "spot" for each, include: Page #(or page, line and/or word within the page) in a Book, a street in a monopoly Game, A state reached in a game or score reached. Each trigger may be associated with a "spot".

When the Activity can't expose this functionality it may have only Pre and Post Spots and it typically does not create triggers except for marking that it completed.

Fields may include all or any subset of the following:
ActivityTriggerSpotID (GUID) Id of this spot
ActivityID (GUID) Id of the activity of this spot
LocationType (int)
  1: Relative (set in the relative location in percentage e.g. 0 start, 50 middle, 100 end.
  2: Dynamic (set by Blob, provided and Identified by the activity RelativeLocation (signed double) −1 not set, 0-100 location in percentage
LocationBlob (variable size binary blob) represents the location of the spot inside the app.
ActivitType table (aka activity type table). typically these are in the PersistantPlatformObjectsDB
There may be plural types of Activities. ActivitType may be a table (in memory) to specify their type and/or to determine or set their place in an activity hierarchy. Fields may include all or any subset of the following:
  ActivityCode (int) (unique key)
  ComponentID (GUID) component ID of Activity Provider (used for the anonymizer.
  ThisGUID may be used together with the UserID by the anonymizer to Identify a User by this component and to translate its ID to a different Component.
  ActivityName (Text)
  ActivityDescription (Text)
  ActivityParentType (int) e.g. 0 if this is a root activity or Activity Code of parent activity type
  SymbolOfActivityType (string) Contains the URL of the Symbol for that activity type.
  ActivityActivationBlob (XML) describing the activation procedure of the activity and its parameters e.g. as for activity activation parameter described herein.
  Each Activity is typically provided by an ActivityProvider (e.g. an activity provider end-user may generate an activity via her or his user interface). plural activities may be provided by a single provider and the parameters passed to it at activation may differ for different activities. Each Activity Provider is typically a Component that runs in the platform and has a ComponentID (used to identify the component and used by the anonymizer to properly anonymize data to and from it.)
  ActivityActivationBlob may include all or any subset of the following elements:
    <ActivityActivationBlob>
      <ActivationType>
        On of:
          <App>
            <ActivationInformation></ActivationInformation>
          </App>
          or
          <WebApp>
            <ActivationInformation></ActivationInformation>
          </WebApp>
          or
          <Library>
            <ActivationInformation></ActivationInformation>
          </Library>
          or
          <DynamicLinkedLibrary>
            <ActivationInformation></ActivationInformation>
          </DynamicLinkedLibrary>
      </ActivationType>
      <ActivationString></ActivationString>
    </ActivityActivationBlob>

Activity Preference table: Fields may include all or any subset of the following: PreferenceID (GUID) unique id of this preference. The OnBordingUI as well as its replacement in the Setup part (that is used to modify after the OnBoarding) may generate these preferences which may each be objects. In addition based on feedback, that the MainUI gathers during and after completion of a session and while consulting with supportive services (anonymously) it may enhance the preferences. "Activity preferences" like "guidance preferences" which adult end-users may select using the preference selection ui element of FIG. 7 may both be created by or via the UI. Activity preference is for, say, Book reading whereas A Guidance Preference is for certain triggers that may appear on top (say) when reading the book.

Example: 3 different adults may select 3 different preferences, corresponding to activities e.g. story readings, that deal respectively with diversity/conflict/friendship.

Preference may be defined as a must (e.g. a book for Age 3-6 may be a must since a 3 year old clearly may not enjoy an activity suitable for 16 year olds) or a prioritization recommendation (Prefer that story setting may be France).

UserID (AnonymizedUserID) (GUID)
ActivityID (GUID)
ActivityTypeID (int) holds ActivityCode of preferred Activity type
ActivityFilter (XML) describes an expression to be applied to select some of the Activity Areas that fit the expression. (e.g. "Book for age 3-6" AND "deals with friendship"
CLTG (Cultural literacy & Life skill Training Guidance) table:
Cultural literacy & Life skill Training Guidance may be provided to the Adult by the system, e.g. when an activity reaches an ActivityTriggerSpot.
Cultural literacy & Life skill Training Guidance describes how to activate/display the Guidance.
Cultural literacy & Life skill Training Guidance may be uniquely designed for a specific spot in a specific activity but may also be much more general.

An example specific CLTG may relate to page 5 of a book, and may ask the child: on this page, are there more flowers or more bees in the picture?

A General CLTG, for all snake-spots defined in a given snakes-and-ladders game, may be "each time the child falls down a snake or chute, use the opportunity to talk with him about how he feels about failure".

The Cultural literacy & Life skill Training Guidance Trigger object connects a CLTG object (aka "a CLTG") with a specific spot e.g. as implemented by the Blob that the app returns in the design session (e.g. as described above) in a specific Activity.
Fields may include all or any subset of the following:
CLTGID (Guid) ID of this CLTG
CLTGActivationBlobs (XML): XML element that describes e.g. to the MAinUI (that is typically operative to decide if it needs to simply show text with an Icon or open some web app that may display complex UI) how to activate the Guidance (and may be similar to activity activation instructions e.g. via the same mechanism as Activity activation as described herein).
ActivityActivationParameters (XML): Private metaData represented as an XML element that holds private meta data that is passed to the activity upon activation
CLTGPlatformParameters (XML) passed to the platform when activating the Guidance Private meta data represented as an XML element that holds private meta data that is passed to the platform upon activation of the Guidance. It holds for example the locations and size of the Activity Window Or location of overlay Menu on top of the Application.

CLTG Trigger Aka Cultural Literacy & Life Skill Training Guidance Trigger Table:
Activity Trigger author e.g. a teacher or psychologist or content expert may use the above-described platform tool that enables him to create ActivityTriggers.
The Platform looks at the ActivitySupportedTriggerSpotstypes Field to determine the supported types of triggers that the activity supports. For example, perhaps:
For type 0, it enables defining 2 types of spots (pre run and post run).
For type 1, it enables description in % of the spot.
For type 2 (dynamic) it activates the activity (e.g. as in the activity description, e.g. as herein) with a Parameter: TriggerDesignMode=True and/or a Parameter "TriggerSelectedCallback" pointing to the TriggerAuthoringUtility. This Activates the Activity in design mode. Thus the activity starts and enables a button—aka "Mark Spot" button—to let the activity notify the designer that activity has reached a specific spot. When the "Mark Spot" button is pressed, Activity typically uses the TriggerSellectedCallback to call the designer and pass it as Parameter a blob that describes the spot. The Designer then typically creates an ActivityTriggerSpots.
When a spot is defined a CLTGTrigger may be defined and may tie a specific CLTG OBJECT to the specific spot in a specific Activity.
Fields may include all or any subset of the following:
CLTGTRiggerID (GUID)
CLTGID (GUID) ID of the CLTG OBJECT for this trigger
ActivityTriggerSpots(GUID) id of this spot
Guidance Area Preference Table:
At boarding as well as later during regular usage Parents and Grandparents may add Guidance Preferences, e.g. via a suitable user interface such as that illustrated in FIG. 7 and its underlying logic. Adults may for example add a preference to train the child in Math and may also designate a specific area "below" the math training e.g. counting till 10, adding till 20, etc. The GrandParent may add a preference e.g. using the user interface element of FIG. 7.

The system may also use usage and behavioral data e.g. the way a child plays in certain games, the way he explores information (exploration patterns . . . ) (for example, perhaps the game has several different Maps that we go through Or it's a casual Cards game and there may be different rules for how to play, or perhaps different exploration patterns are used e.g. if we lookup information and an encyclopedia that has references, different patterns may be reading a title to its end then reading the nearby title vs. Surfing through Links in an intuitive manner vs. Randomly Jumping between Items), the type of CLTGs that a certain grandparent selects (e.g. which logical combination of cltg metadata predicts this grandparent's selections), feedback from the Grandparent about the CLTGs and the activity . . . this data may as discussed below be stored in a bigdata repository, suitably anonymized and provided through the platform. The system may also automatically add preferences e.g. the system may use behavioral data to categorize a child's playing ability for a certain game (by ranking the child's ability relative to big data the system has collected) and based on its categorization recommend activities that other children of same category have enjoyed. Such system-provided preferences are also termed herein an "automatic" preference. Other criteria e.g. area preference may reflect Age/developmental appropriate content.

Strategies for setting preferences may include consulting with external providers e.g. external human experts that research the big data, and create general recommendations/policies, or automatic services that, say, return the current top 10 bestselling books etc. e.g. as described elsewhere herein. There may be such external providers may be a service that runs on the platform and typically has a component Identity that enables the anonymizer to give it access to data, like the Activity and Trigger. This component may, e.g. in the background, add preferences to a suitable table e.g. the Preference table e.g. as described herein.

Another method may operate like a recommendation service that shows a recommendation when an adult user is entering the preference selection UI (e.g. that shown in FIG. 7) and may add buttons that the adult may select from Identity is typically anonymized while this consultation is ongoing.

Guidance Area may be a service e.g. component provided by a provider other than the Activity Provider that typically includes all or any subset of Personalization of preferences by looking at usage/progress/special tests/questioners/using AI algorithms looking at the BigData of usage (and for example Identifying use patterns and proposing same Guidance for same use patterns. Other services may look at usage data) that the system is configured to collect/consulting with External Curriculum/Consulting with professional mentors etc when deciding which Guidance to provide. When using a component, the component may be activated as described in the GuidanceAreaActivationBlob that is part of the Guidance Type object.

Fields may include all or any subset of the following:
GuidanceAreapPreferenceID (GUID) unique Index
UserID (AnonymizedUserID) (GUID)
GuidanceAreaCode (Guid) unique ID
GuidanceAreaFilter (XML) describes an expression such as an SQL Sentence or LINQ sentence that may be applied to select some of the Guidance areas that fit the expression.
    Logical expression with Sort terms for preferences may be implemented as SQL sentences/LinQ sentences/ or using XML with terms: Field operator (=>< >=<=< > . . . ) Field
    Logical Term (And Or Not) . . . (and Sorting for prioritization) Order By Field then By Field . . .
    For Example
        When the system Activates an Activity it may need to find the proper CLTGs It is appreciated that typically, each Preference sets the rules what fits and what does not, and typically, Sort terms set the priority by which Items are picked/presented the term "FIT" refers to whatever fits the preferences of the adult e.g. GrandParent/Parent.
        It is appreciated that Activity Provider is typically one of the fields of the Activity Type table described herein); and typically includes a ComponentID of the activity provider where componentIDs are used as a basis for anonymization)

Guidance Areas Table:

This may be a table in memory which describes various Guidance areas (this may be a Data structure that the MainUI creates and then uses it to display the overlay UI. It is created on the fly and there is no need to keep a persistent version of it) such as Emotional support (with sub areas such as, say, support child's Happiness, support child's Sadness, support child's Anger, support child's fear) Math, Spelling.

Fields may include all or any subset of the following:
    GuidanceAreaCode (GUID) unique ID
    GuidanceAreaName (string)
    GuidanceAreaDescription (string)
    GuidanceAreaType (GUID)

Guidance Type Table:

There may be plural types of GuidanceAreas. This Guidance Type table may specify their type and may set their place in the GuidanceAreaType hierarchy.

Fields may include all or any subset of the following:
    GuidanceAreaTypeCode (int) (unique key)
    ComponentID (GUID) component ID of Activity Provider (used for the anonymizer like in ActivityType table)GuidanceAreaTypeName (Text)
    GuidanceAreaDescription (Text)
    GuidanceAreaParentType (int) 0 if this is a root GuidanceArea or GuidanceAreaTypeCode of parent GuidanceAreaType
    SymbolOfGuidanceAreaType (string) Contains the URL of the Symbol for that activity type.
    GuidanceAreaActivationBlob (XML) describing the activation procedure of the GuidanceArea component and its parameters e.g. as described herein with reference to activity objects.

Identity table: User Identity management may be as described elsewhere herein.

Generally, the platform described herein is configured for Enabling Guidance (from different providers) on top of Activities (from different providers) as an overlay on a communication platform while maintaining the highest level of privacy of the end users (where the end users include children under 13 Years Old)

Certain embodiments herein provide a platform that support personalization while enabling different providers e.g. content providers to participate, while also maintaining privacy of the users Parents and GrandParents, but especially children who may be <13 YO. This may be achieved by the usage of an Anonymizer component that keeps or stores the Identity of each person and reflects that identity with a specific Token (which may be sent) to each component (e.g. to same or different providers). This creates consistency for the component in that the same user is represented with the same token each time, for that component) but between components, the same user has different Identity tokens, So that all users in the system are antonymic. it is appreciated that for each Component (e.g. module or functionality of the system), to keep Privacy at highest level, Component Bounds may be set between different Providers so as not to share data with external end-users. to increase the level of security the different system components (Activities, CLTGs, AI Services, Behavioral Services, MainUI Designer Etc) may be separated thereby to maintain the privacy of the users.

When a user logs in, typically, his credentials are verified and the anonymizer gives him his UserToken for the specific component that needs to use it. The anonymizer typically knows which component "needs" to use the token, by virtue of the tables described below.

It is the responsibility of the Platform e.g. the platform of FIG. 4C e.g. the layer that connects all components to the anonymizer and to the Data So User IDs are Anonymized and the right Data comes out. (that typically provides the API to access the Identity and that provides the way for the different components to communicate with each other) to replace the IdentityTokens when traversing data from component to component.

Typically, components communicate with one another e.g. by using a message queue model (e.g. as per microsoft msmq) this closes the protocols and communication Models. For Formats of the message it is specific for the specific protocol between the components. For example it may be XML messages where USERIDTokens may appear and as an element that the anonymizer may replace when messages are routed. Regarding the API, the data traversing, and how tokens are replaced, again any suitable technology may be used. For example, when 2 components "need" to consult or otherwise communicate (say MainUI needs to consult with and External Content Provider regarding the priority of Activities to show to the user), typically, both need to refer to the same user.

In order to maintain privacy, each component typically refers to the user with a different Token.

Figure 12:
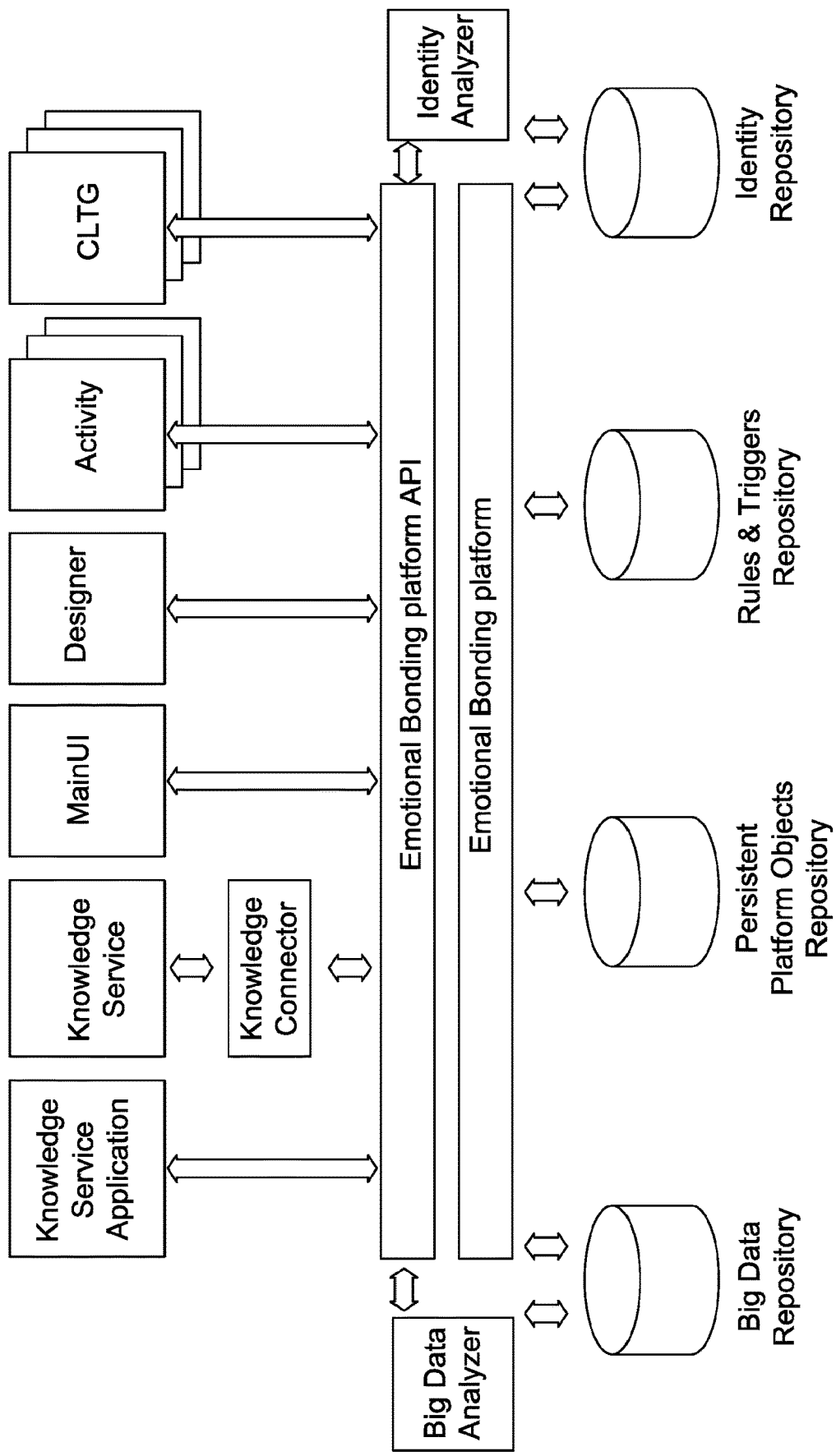
FIG. 12 is a simplified block diagram of a system in accordance with an embodiment of the invention.

It is the task of the platform (through the platform API) e.g. as shown in FIG. 12 to provide a communication layer between the 2 components (for example using MSMQ as the Model to travers Data between the components) typically, components send a message to a Queue and Dequeue from a Queue. When a message contains Tokens (that point to a user), they typically need to be translated. Regarding the user Identity, typically, a tuple (ComponentToken,UserToken) describes a unique user as seen by the component whose token is given). So when traversing a user between components the Platform API typically verifies the Rights of the 2 Components to communicate and traverses the Data between them and then replaces the User Token to fit the Target component. This table holds for each user(UserID)

The Identity (IdentityToken) per each Component (ComponentToken) that has accessRights to his Data.

Fields may include all or any subset of the following:
UserID (GUID) Identify a unique user
IdentityToken (GUID)
ComponentToken (GUID)
ComponentTable
ComponentID (GUID)
ActivityProviderID or GuidnceProviderID or PreferanceProviderID
ComponentToken (GUID) (for the anonymizer)
ComponentName (Text)
ComponentDescription (Text)
Non persistent Objects:

As opposed to objects described earlier which are persistent hence have a persistent representation in a DB, non-persistent objects may be built on the fly and exist (only) for the UI. this db may comprise an internal Data structure built in the MAinUI not stored in the DB (used to prepare the (Pop Like UI with the tree of various types and possible actions/Guidance) dynamically. non-persistent objects may for example include:

Cultural Literacy & Life Skill Training Guidance Offering Objects Aka CLTG Offering Objects (Popup—Hierarchical):

This object is typically a run time Object created AdHoc. This object may comprise a PopUp or popup-like Element. This object may be created when a Cultural literacy & Life skill Training Guidance trigger, aka CLTG trigger, happens or fires. Using information stored in the CLTG object, the system/component fills the CLTG offering with content. Typically, the CLTG object includes an Icon and a text or message typically written by a suitable expert end-user of the platform, which is the emotional Guidance, cognitive Guidance, School Practice or personal skill building Guidance. to the Adult. When a single text message is not enough for the Guidance the text message may describe the offering and may appear tappable (e.g. as a button). When tapped a Component (e.g. that shows UI with controls) may be executed and display more complex Guidance. For example a math Guidance may contain Menus to select specific types of proposed training (like counting, addition, subtraction multiplication.) When the user selects one of these types, it shows the selected Guidance. Other may be even Games that may work like Activities. The CLTG object may also include activation instructions for a specific component (e.g. a mechanism like that used for activating an activity)

The CLGT offering Object typically comprises a UI object e.g. in UI of FIG. 4C that may be used as a popup to let the adult know that there are guidance offerings. The CLGT offering Object typically displays plural offerings e.g. in the form of a tree where the top types in the tree are displayed and the user then picks one of the displayed types, responsive to which the user may see the selected offering type and see its subtypes, and so forth re selection of a subtype responsive to which the subtype's subtypes are presented to the end-user, and so forth, until a the specific guidance has been selected.

"Simple" CLTG (or Cultural literacy & Life skill Training Guidance) offerings may be created by the system, for example by an external provider using AI algorithms, typically consulting with Big Data DB and typically finding a "personalized good fit" when the guidance is a "simple" Text message, like: "ask John if he . . . " as opposed to a complex UT/Special Game that may be activated. A text message may be displayed and does not require activating a different component or allocating space on the screen.

The system may display the text directly in the menu.

Simple Types may be displayed as buttons.

Other more complex offerings may be created/managed by activating an external component.

for example, consider an instance of Mathematical Guidance. A simple guidance would be to count the number of butterflies in the picture (assuming there is an Image displayed on the book). A complex Guidance would bring up a Ui component that may overlay the picture part of the Book and contain a copy of that Image with an overlay of polygons which, when selected e.g. tapped, may be filled with a partly transparent fill and help the child "Mark" the parts that he counts. There may be elements that may help the child draw attention to the Parts that are to be counted by making the polygons blink. Each counting may raise or increment a displayed counter . . . .

A difference between simple (e.g. no program involved . . . ) to Complex where a special code needs to be involved May be as follows: complex offering may use a special UI to display itself. In this case a component may be built, activated and executed like an activity. It may display itself as an overlay on top of the Activity or side by side with it. Complex types may be displayed in complex ways like Pins on a Map e.g. Use polygon of Pins and add one on a tap, allows to drag them, Open popup menu on LongTap and delete them (they may also be deleted when dragged to outside of the map . . . ) And Guidance may include one or more of an image, a video, a text or a complex UI element e.g. as exemplified above in the math and map examples.

The CLTG (or Cultural literacy & Life skill Training Guidance) offering may be represented as an overlay e.g. the "you may read the page . . . " overlay in FIG. 8. Typically, the overlay is provided in the screen displayed to the adult user and not in the screen displayed to the child user.

The overlay may occupy all or a portion of the screen (displayed e.g. to the adult user) such that the overlay may replace the image of the activity or may be adjacent e.g. side by side (as in FIGS. 9, 10) with that image.

For example, the child may be shown a display image including various objects such as fish, scissors and a chessboard, and the adult, as shown in FIG. 8, may be shown the same image, aside a CLTG offering overlay which suggest to the adult to practice one of several possible skills with taylor, such as, say counting, spelling, vocabulary, or self-esteem. Selecting one of these skills (such as counting) may result in presentation of a suitable overlay e.g. the "ask taylor . . . " overlay in FIG. 9

Any suitable technology may be used to allow the system to generate the overlap of FIG. 9 responsive to the adult selecting the "practice spelling" option in the overlay of FIG. 8. For example, when Activating an activity the MainUI gives it the list of Spots that when hit may generate a trigger.

When a spot (in the activity) is reached the Activity it may trigger the MainUI with the Spot that it reached.

The Main|UI then Looks at the list of triggers that "need" to happen for that spot. It typically takes in account the filters (e.g. to select the appropriate suggestions as well the sort to prioritize them.)

The MainUI Groups the Triggers and organizes them in a tree (e.g. by the TriggerType). Each Trigger typically has a Type and Trigger Types typically have a parent type such that this creates a Tree. For example 2 Math Triggers (say, "count . . . " and "which do we have more of . . . ") belong to the Math tree part whereas where "How do you spell . . . "Belongs to the spelling tree part . . . Whereas "Ask . . . how she felt" belongs to the emotional guidance tree part.

The Trees are created and reflect the ways the UI may be evolved.

At that point, typically, the Main UI determines the type of POP UP it may use (overlay/side by side . . . ) and acts accordingly. For Overlay it may open a transparent window on top of the activity and display the top level Menu (e.g. top parts of the tree), enabling the user to tap a tree element to its leaves. A tap on a leaf (if it is a complex leaf—Simple leaf is a simple text lable . . . ) opens it (like opening activity).

FIG. 8 shows an activity. When the activity reaches a spot the activity typically triggers the platform e.g. MAinUI(with the indication of the spot). Responsively, the platform typically finds all triggers e.g. as described above.

The CLTG Trigger aka Cultural literacy & Life skill Training Guidance trigger table links Spot with CLTG Trigger. All triggers of a spot may be found that are triggered. The system builds the Trigger tree; typically this Tree is built to memory (per case, based on the user filters as described in the preference table . . . ) such that For each CLTG trigger If there are several CLTG triggers that are of the same CLTG type it may display the CLTG type. it then replaces CLTG types of same type with their Parent type. it is appreciated that typically, Trigger types have parent which creates Trigger type trees and also, typically, Activity types have parents (like Triggers) and this way may be grouped into activity trees, typically until the Types are unique within the entire tree. While doing so the trigger tree for this event (Spot) is created. This tree is then displayed. Typically, the Main UI Displays to the user (e.g. on the Grandparent side—for him to be able to decide if he wants to act on the guidance in order to make the session emotionally effective) as buttons and text (in the simple scenario) (FIG. 9 is a "simple" overlay scenario showing 4 buttons (practice counting, practice spelling, vocabulary, self-esteem) of the different parent CLTGTypes. e.g. Math Spelling etc. on top of the activity) or as a UI tree in the complex UT scenario by the CLTG component.

The term "bondee" as used in the specification and drawings simply refers to a system constructed and operative in accordance with an embodiment of the present invention.

Usage Data:

The system typically collects usage data in an antonymic way typically using the anonymization process). Each component may store Usage data in a component-specific Big-Data repository or in a bigData repository common to plural components. When storing data a suitable Anonymization process is used e.g. as described herein, which converts the Tokens from the "storing component" user token to the "BigData" component USerToken. This way the data stays anonymous in the BigData repository.

Usage Data typically include or are associated with an indication of the user that was involved in creating them. To keep the privacy UserIDs are typically Tokenized (e.g. Stored with the BigData Component Token) See description of Token technology herein. Component may need to consult (e.g. look for some specific User Usage Data) For example an external Provider may need to consult the MainUI with Priorities for a specific User (by looking at patterns found in the Big Data and finding a proposal for that user . . . )

Session Table:

This table may include all or any subset of the following fields:

The data stored is categorized by Session—Each adult-child communication episode where an adult and a child go through at least one activity is typically defined as a session. The session has a unique ID and what happens in it is Logged (anonymously) e.g. in the session table. For example, all or any subset of the following may be logged: start and end time, data re what activities took place, between which adult & which child, all the data typically being logged in the tables below.

Fields may include all or any subset of the following:
SessionID (GUID) unique key
SessionStartTime (DateTime)
SessionEndTime (DateTime)

Session Participant Table:

This table may include all or any subset of the following fields:
SessionID (GUID) unique key and/or
Participant (UserID (AnonymizedUserID) (GUID)

Session Triggers Table:
This table may include all or any subset of the following fields:
   SessionID (GUID) unique key and/or
   CLTGTRiggerID (GUID)
SessionData table (typically stores nonpersistent objects)
This table may include all or any subset of the following fields:
   SessionID (GUID) unique key
   ComponentID (GUID)
   ComponentData (BinaryBlob) e.g. storing what happened inside the component, typically (in the Component language.
   CLTG offerings table
   Usage Data table (a BigData Table)
   Session table (a BigData Table)
   Session Participant table (a BigData Table)
   Session Triggers table (a BigData Table)
   SessionData table (a BigData Table)
These tables may for example reside, in the big data warehouse of FIG. 12.

Reference is now made to FIG. 12 which illustrates a system, all or any of whose modules as illustrated may be provided, in accordance with certain embodiments. Each module includes a suitably configured processor or logic; although of course a single processor may be used to implement all modules or any subset thereof.

The system may be used in conjunction with any of the methods described herein.

Specifically, the system of FIG. 12 may include all or any subset of the following:

Emotional Bonding platform API-includes API and protocols layer that enables the components to access the functionality that the Emotional Bonding Platform exposes.

Emotional Bonding Platform-includes layer which implements all or any subset of the Platform functionalities and methods described herein. Together, Emotional Bonding platform API and Emotional Bonding Platform are termed herein "the Platform"

Knowledge Service Application—includes components that provide information and preferences to help personalize the Activity and CLTGs. They may also support Activity and provide Content to Activities and CLTGs.

Knowledge Service may be similar to a Knowledge Service Application e.g. as described herein although typically with a Service architecture. They may connect through Knowledge Connector APIs.

Knowledge Connector may expose a set of APIs for Knowledge Service Applications.

MainUI comprises a Platform UI and/or execution Engine used to start a session, connect the parties, select and execute the Activity receive the Triggers from an Activity when the activity Identifies that it reached a spot, at that point it builds and displays the "suggestions tree" and activate "Complex" triggers. The Main UI is responsible to Logg the session activity. At the end of the activity the Main UI collects feedback. as described int the spec (some times at the beginning appeared as the Platform)

Designer is a component used for Authors of CLTGs to describe spots and the CLTGs that may appear at the Spots.
   Activity e.g. as described herein
   CLTG e.g. as described herein.
Big Data Analyzer typically comprises a component that analyzes the Big Data that is collected, e.g. as described herein. Knowledge services may consult with data that comes from the Big Data analyzer to help Personalize and suggest activity CLTGs and prioritize them Identity Anonymize typically comprises a sub component of the Platform that converts UserTokens between components.

Persistent Platform Objects Repository typically comprises a Database where the persistent platform data resides although some may be stored in the rules & Triggers repository.

Rules & Triggers Repository typically comprises a database in which some of the Platform persistent Data the "Rules and Triggers (CLTGs)" are stored e.g. for performance and separation reasons.

Persistent Platform Objects referred to herein may be implemented by the Persistent Platform Objects Repository and Rules & Triggers Repository.

Identity Repository typically stores the Identity portion of the Persistent Platform Objects.

Big Data Repository typically stores all or some of the Big data described herein.

FIG. 13 is an example screenshot which may be generated by a designer user interface where the designer may select spots within activities at which to provide guidance objects.

As shown, a Book reading Activity (by way of example), is open, in a specific book in Design Mode in the designer user interface (on the right side of the illustrated screen) The operator may have swapped or scrolled down pages (using the Book reading app controls) till she reached this page and then Pressed "MARK" button. On the left top portion of the screen "Spots" for this Book are seen.
   Pre—is a Spot before end users start the Activity
   Post—is a spot after end users start finish the activity
   1 and 2 are example Spots inside (during) the Book activity.
   Spot #1 is highlighted and its CLTG List appears below (2 CLTGs in the list); the first which is being edited (Fox's Intentions) is a simple CLTG (text only) with a proposed question: (Do you think the . . . ) It may appear as Overlay and its type has not yet been selected by the designer end-user. CLTG #2 has not yet been entered. To add more CLTG the end-user may use the +button.
   Selecting the "Link" checkbox opens an extra UI for describing a Complex CLTG that involves a component that may run; thus it includes specifying the Activation and Parameters for the component that implements the CLTG.

Functionalities and architecture herein may be combined with any of the embodiments described in the co-owned published patent documents mentioned herein in the Background section, the disclosures of which are hereby incorporated by reference.

It is appreciated that terminology such as "mandatory", "required", "need" and "must" refer to implementation choices made within the context of a particular implementation or application described herewithin for clarity and are not intended to be limiting since in an alternative implementation, the same elements might be defined as not mandatory and not required or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein may be deployed in a cloud environment. Clients e.g. mobile communication devices such as smartphones may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true, and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may for example comprise changing the state or condition or may more generally cause any outcome which is technically advantageous given the state or condition or data, and/or may prevent at least one outcome which is disadvantageous given the state or condition or data. Alternatively or in addition, an alert may be provided to an appropriate human operator, or to an appropriate external system.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments, or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example and instead, embodiments of the present invention may be implemented, say, as a smartphone SDK; as a hardware component; as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network, or is tethered directly or indirectly/ultimately to such a node).

The invention claimed is:

1. A computerized system providing parental supervision of child consumers of digital media, the system comprising:
an electronic repository of digital content;
user interfaces for each of various categories of end user including knowledge area experts, the interfaces including at least a children end-user user interface, an adult end-user user interface, a digital content provider user interface and a guidance provider user interface, for use by children end-users, adult end-users respectively associated with specific end-users from among said children end-users, digital content providers uploading digital content items into said repository and guidance providers providing guidance objects for adults to use during sessions with children end-users, wherein said guidance objects, presented to the adult but absent from data presented to the child, are each specific for (a) subsets of said children end-users, said subsets being defined in terms of metadata stored for individual children from among the children end-users, and for (b) specific spots within, or portions of, specific items in said digital contents items; and
logic including at least a central processor and configured to control interactions of said user interfaces with said processor and between various end-users at least partly depending on the category of each end-user,
wherein said logic is operative to present at least one overlaid digital content item to at least one child C from among the child end-users, including generating said overlaid digital content item by selecting a guidance object G which is specific to a subset S to which child C belongs, and integrating said guidance into said digital content item as an overlay, wherein the overlay presenting said guidance objects for adult end-users is displayed simultaneously with a screen display seen by the child end-user.

2. The system according to claim 1 wherein the logic enables parents to define rules to be enforced on their children's consumption of selected digital content times.

3. The system according to claim 1 and also comprising a big data repository storing big data, at least some of which is anonymized, characterizing the children end-users' behavior vis a vis the system including the children end-users' consumption of digital content.

4. The system according to claim 3 and wherein the system also includes a sub-system for with communication functionality e.g. social networking and/or email, for children users and wherein the big data repository also includes big data characterizing the children end-users' behavior vis a vis said sub-system.

5. The system according to claim 1 which includes a personal assistant which manages the child's schedule and a digital health management subsystem which supervises the child's digital consumption and wherein the assistant and subsystem share data such that a child consumes digital content according to rules defined within the system and at times and/or as per conditions defined within the personal assistant.

6. The system according to claim 1 which limits child consumption of content at least partly based on educational ratings of content such that all other things being equal, a child may be allowed to consume either more content rated as more educational or less content rated as less educational.

7. The system according to claim 1 which creates an economy including digital coins which buy access to otherwise restricted data (e.g. content) in return for generating data for the system (e.g. if an end-user performs educational research, this may buy digital entertainment time for that end-user).

8. The system according to claim 1 wherein said digital content items includes at least one of the following activities: games, books, audio visual content, augmented reality content.

9. The system according to claim 1 wherein said metadata comprises child-age-metadata which characterizes at least ages of said children end-users and wherein said guidance providers provide at least one guidance object for adults which is specific for a subset S of said children end-users which is defined in terms of the child-age metadata such as a subset of all children end-users whose ages fall between 5 and 8 years.

10. The system according to claim 1 wherein the system provides big data regarding children end-users to at least one user of the system and wherein the system also comprises an anonymizer configured to anonymize said big data before said big data is provided to said at least one user of the system.

11. A computerized method providing parental supervision of child consumers of digital media, the method comprising:
providing an electronic repository of digital content;
providing user interfaces for each of various categories of end user including at least a children end-user user interface, an adult end-user user interface, a digital content provider user interface and a guidance provider user interface, for use by children end-users, adult end-users respectively associated with specific end-users from among said children end-users, digital content providers uploading digital content items into said repository and guidance providers providing guidance objects for adults to use during sessions with children end-users, wherein said guidance objects, presented to the adult but absent from data presented to the child, are each specific for (a) subsets of said children end-users, said subsets being defined in terms of metadata stored for individual children from among the children end-users, and for (b) specific spots within, or portions of, specific items in said digital contents items; and providing logic including at least a central processor and configured to control interactions of said user interfaces with said processor and between various end-users at least partly depending on the category of each end-user, wherein said logic is operative to present at least one overlaid digital content item to at least one child C from among the child end-users, including generating said overlaid digital content item by selecting a guidance object G which is specific to a subset S to which child C belongs, and integrating said guidance into said digital content item as an overlay, wherein the overlay presenting said guidance objects for adult end-users is displayed simultaneously with a screen display seen by the child end-user.

12. A computer program product, comprising a non-transitory tangible computer readable medium having computer readable program code embodied therein, said computer readable program code adapted to be executed to implement a computerized method providing parental supervision of child consumers of digital media, the method comprising:

providing an electronic repository of digital content;

providing user interfaces for each of various categories of end user including at least a children end-user user interface, an adult end-user user interface, a digital content provider user interface and a guidance provider user interface, for use by children end-users, adult end-users respectively associated with specific end-users from among said children end-users, digital content providers uploading digital content items into said repository and guidance providers providing guidance objects for adults to use during sessions with children end-users, wherein said guidance objects, presented to the adult but absent from data presented to the child, are each specific for (a) subsets of said children end-users, said subsets being defined in terms of metadata stored for individual children from among the children end-users, and for (b) specific spots within, or portions of, specific items in said digital contents items; and providing logic including at least a central processor and configured to control interactions of said user interfaces with said processor and between various end-users at least partly depending on the category of each end-user, wherein said logic is operative to present at least one overlaid digital content item to at least one child C from among the child end-users, including generating said overlaid digital content item by selecting a guidance object G which is specific to a subset S to which child C belongs, and integrating said guidance into said digital content item as an overlay, wherein the overlay presenting said guidance objects for adult end-users is displayed simultaneously with a screen display seen by the child end-user.

13. The system according to claim 1 wherein adults select activity preferences and guidance preferences where guidance preferences are for certain triggers that may appear while a certain activity is ongoing.

14. The system according to claim 1 wherein a system screen is divided such that images of a child and adult interacting with the child and a communication layer user interface appear side by side.

* * * * *